(12) United States Patent
Carrara et al.

(10) Patent No.: US 9,415,943 B2
(45) Date of Patent: Aug. 16, 2016

(54) CONVEYOR SYSTEM DEVICES WITH CONTAMINANT REMOVAL FEATURES

(71) Applicant: System Plast S.r.l., Telgate (IT)

(72) Inventors: Osvaldo Carrara, Ranica (IT); Giuliano Marella, Palazzolo s/O (IT); Alain Berenbach, Kaltenhouse (FR); Philippe Seyer, Bischheim (FR)

(73) Assignee: SYSTEM PLAST S.R.L., Telgate-Bergamo (IT)

( * ) Notice: Subject to any disclaimer, the term of this patent is extended or adjusted under 35 U.S.C. 154(b) by 0 days.

(21) Appl. No.: 14/467,396

(22) Filed: Aug. 25, 2014

(65) Prior Publication Data

US 2015/0060242 A1 Mar. 5, 2015

(30) Foreign Application Priority Data

Aug. 27, 2013 (FR) ..................... 13 58218

(51) Int. Cl.
B65G 23/06 (2006.01)
B65G 39/02 (2006.01)
B65G 45/10 (2006.01)

(52) U.S. Cl.
CPC ............... *B65G 39/02* (2013.01); *B65G 23/06* (2013.01); *B65G 45/10* (2013.01)

(58) Field of Classification Search
CPC ...... B65G 39/02; B65G 39/073; B65G 23/06; F16H 55/171
USPC ........... 198/494, 834; 474/152, 162, 188, 189
See application file for complete search history.

(56) References Cited

U.S. PATENT DOCUMENTS

| | | | | |
|---|---|---|---|---|
| 1,922,357 A * | 8/1933 | Divney | ................... | B62D 55/12 305/115 |
| 2,232,623 A * | 2/1941 | Neuman | ................ | B65G 39/02 198/494 |
| 2,339,069 A * | 1/1944 | Gemeny | ................... | F16H 55/44 198/711 |
| 3,068,711 A * | 12/1962 | Even | ................... | B62D 55/0885 474/164 |
| 4,143,757 A * | 3/1979 | Wallenfang | ........... | A01D 43/082 198/494 |
| 4,634,409 A * | 1/1987 | Johnson | ..................... | F16G 1/28 474/152 |
| 5,352,029 A * | 10/1994 | Nagorcka | .............. | B62D 55/08 305/115 |
| 5,417,617 A | 5/1995 | Milton | | |
| 6,047,785 A * | 4/2000 | Snyder | ................. | B62D 55/088 180/9.1 |
| 6,099,427 A * | 8/2000 | Brown | .................... | B65G 23/06 198/498 |
| 6,371,579 B1 * | 4/2002 | Phely | ................... | B62D 55/088 305/115 |
| 2005/0096169 A1 * | 5/2005 | Reichard, II | ............ | F16H 55/36 474/152 |
| 2010/0105509 A1 | 4/2010 | Tomobuchi et al. | | |

FOREIGN PATENT DOCUMENTS

| | | |
|---|---|---|
| DE | 2804549 A1 | 8/1979 |
| DE | 9010945 U1 | 2/1991 |
| JP | H01-143462 U | 10/1989 |

OTHER PUBLICATIONS

Search Report and Written Opinion in related French Patent Application No. 1358218, dated Apr. 28, 2014, in 9 pages.

* cited by examiner

*Primary Examiner* — William R Harp
(74) *Attorney, Agent, or Firm* — Knobbe, Martens, Olson & Bear, LLP

(57) ABSTRACT

Various embodiments of conveyor system devices, such as sprockets and idlers, are disclosed. The conveyor components can comprise axial and/or radial openings that facilitate the discharging of debris and other contaminants, which can reduce wear and/or prolong component life. In some embodiments, the conveyor component ramps convey the debris and contaminants to the openings.

25 Claims, 17 Drawing Sheets

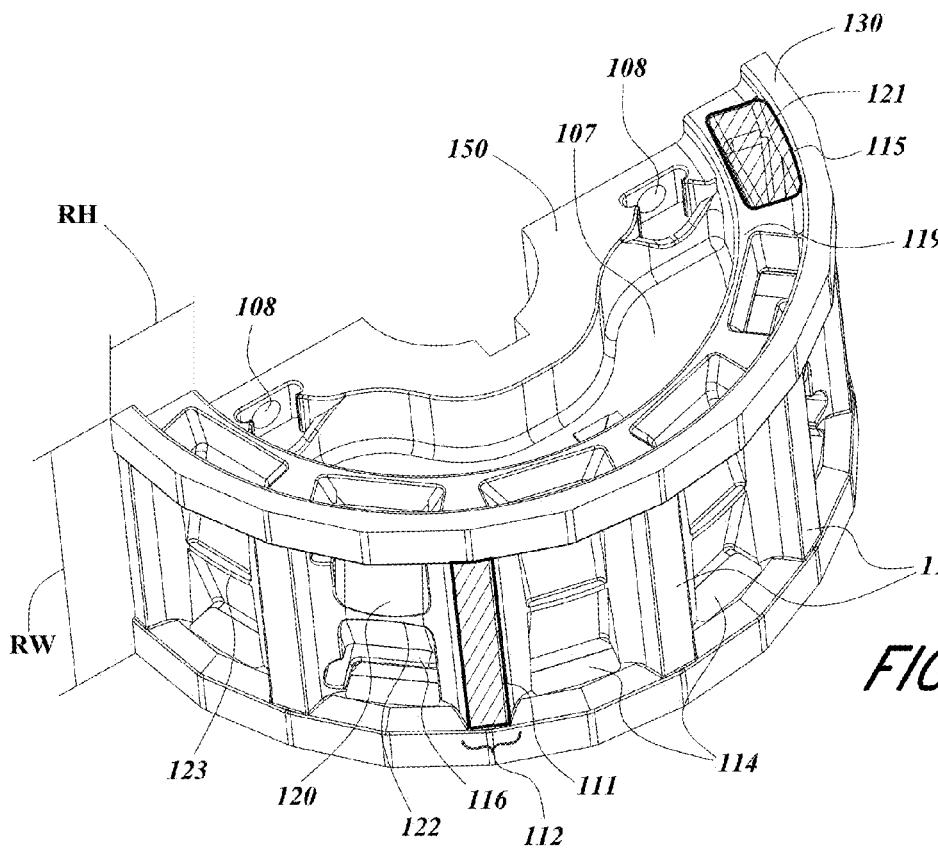
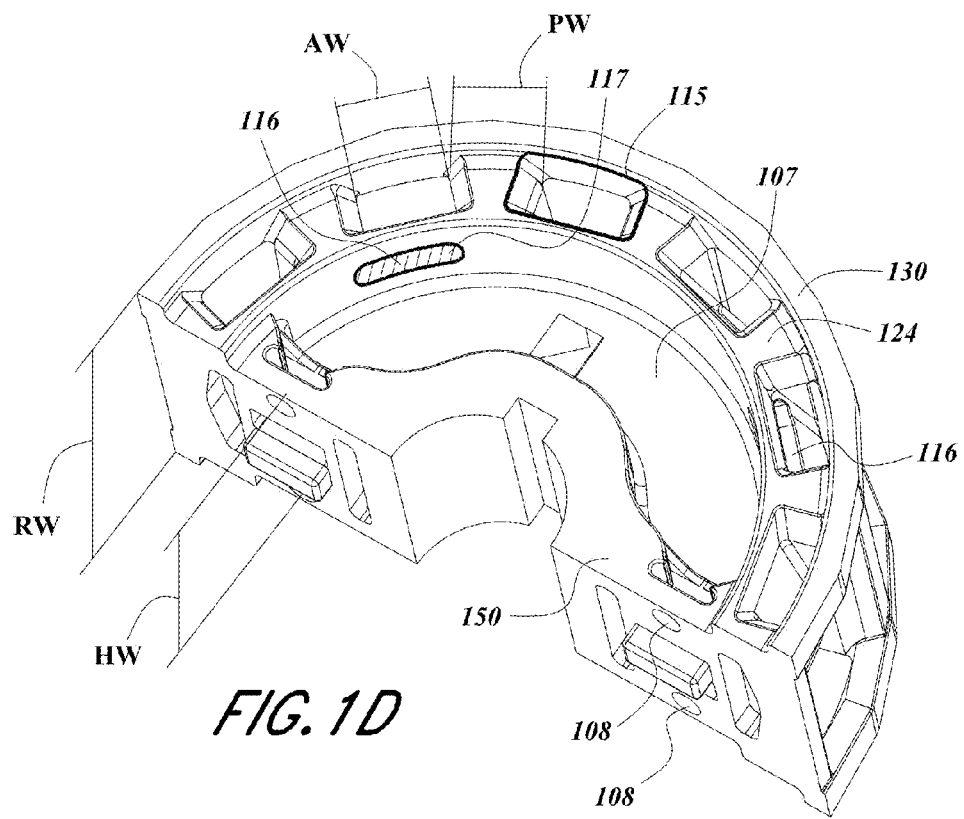

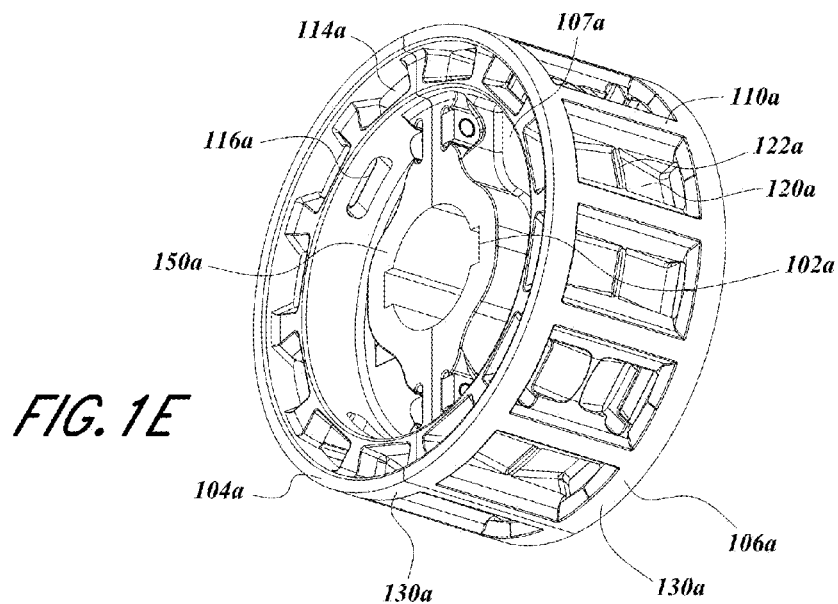
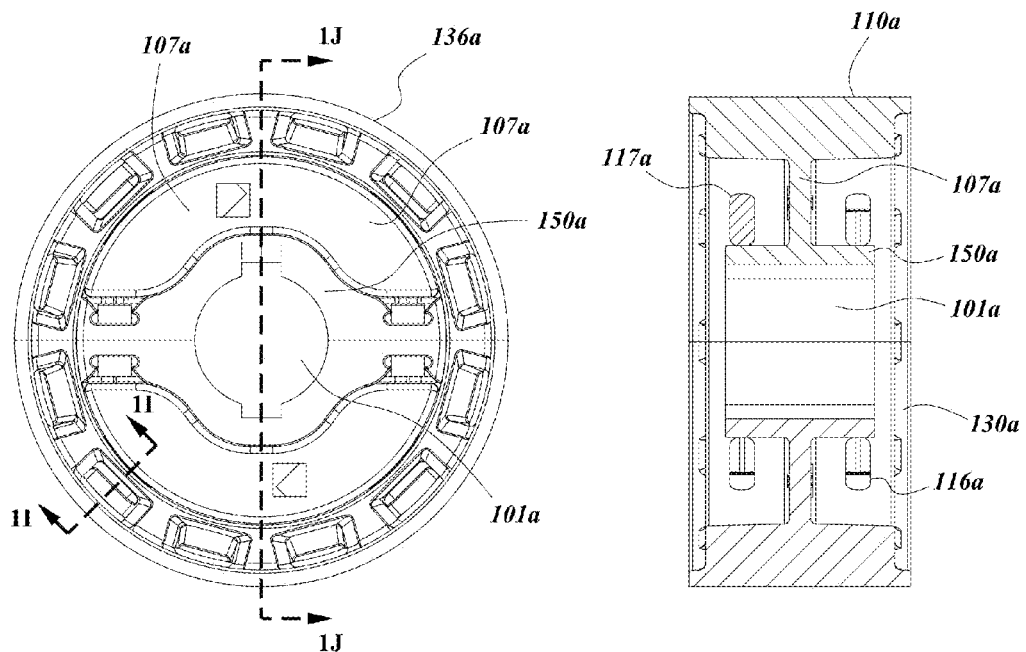

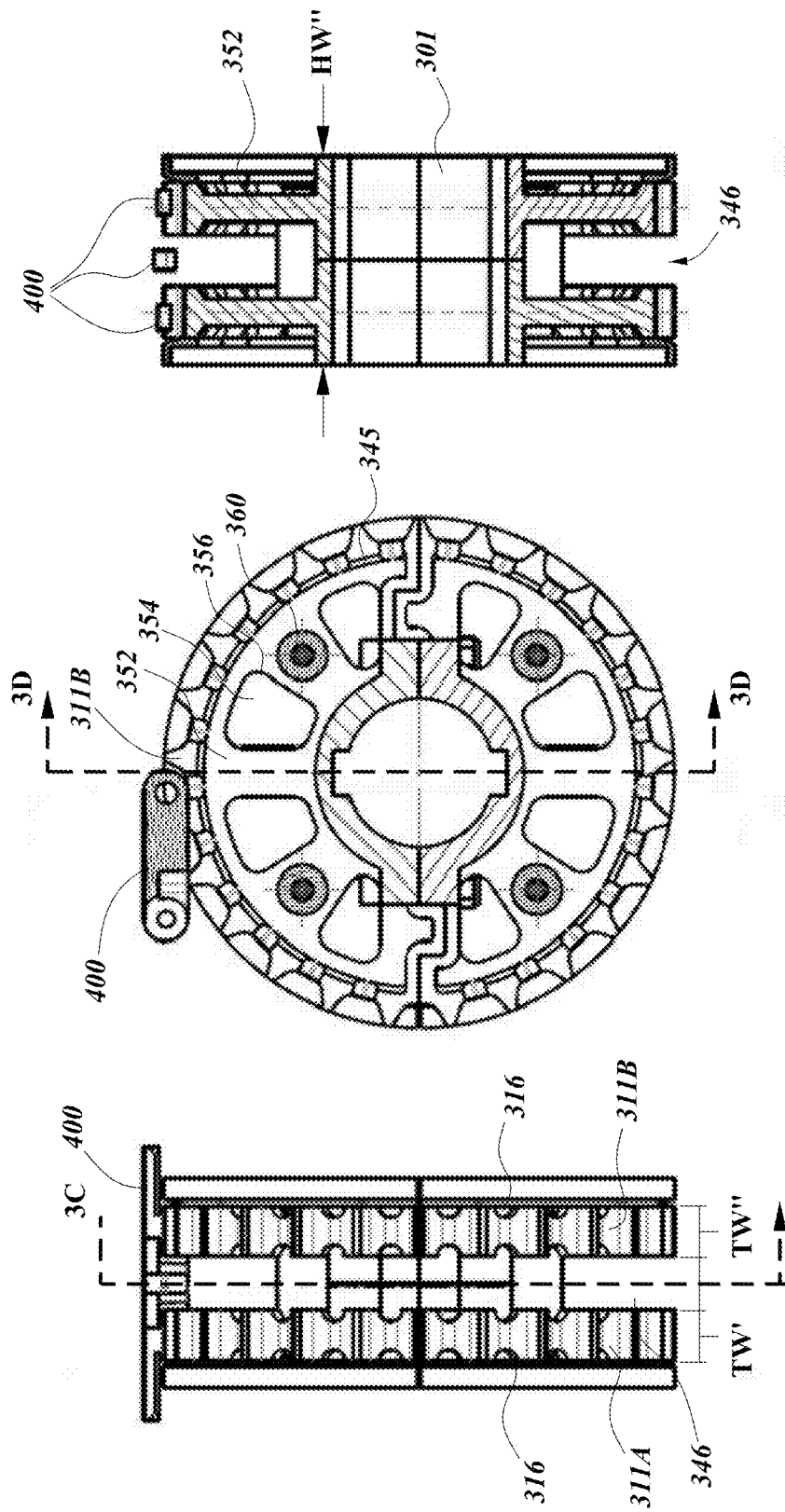

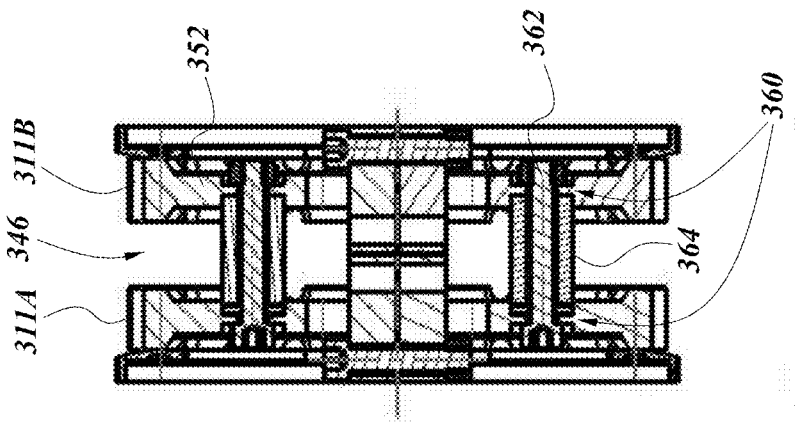
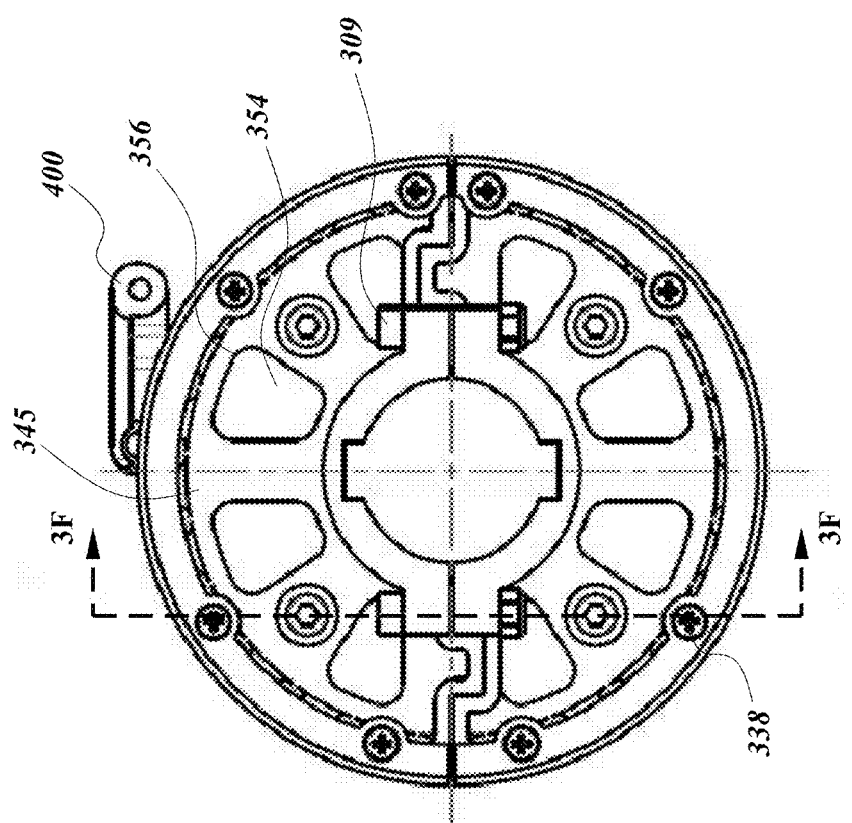

CONVEYOR SYSTEM DEVICES WITH CONTAMINANT REMOVAL FEATURES

CROSS REFERENCE TO RELATED APPLICATIONS

The present application claims the priority benefit under at least 35 U.S.C. §119 of French Patent Application No. 1358218, filed Aug. 27, 2013. This French application and any other applications for which a foreign or domestic priority claim is identified in the Application Data Sheet filed with the present application are hereby incorporated by reference in their entireties herein under 37 C.F.R. §1.57.

BACKGROUND

1. Field

The disclosure relates generally to the field of conveyor systems, such as to devices that engage a conveyor chain or belt, such as sprockets and idler wheels.

2. Description of Certain Related Art

Conveyor systems generally include a driving device, such as a sprocket, and a driven device, such as a chain or belt. In various embodiments, the chain or belt can be a generally endless loop and can be configured to engage the sprocket such that rotational movement of the sprocket results in translational movement of the belt or chain. Thus the sprocket can drive the belt or chain, which in turn can convey goods and articles.

Certain conveyor systems include a guiding and/or tensioning device, such as an idler wheel or roller. Although the idler wheel typically does not provide a driving torque, the idler wheel can be configured to engage the chain to facilitate routing and/or maintaining proper force on the chain. For example, in some conveyor systems, the idler wheel is located generally at an opposite end of the conveyor system compared to the sprocket, and the chain passes around and extends between the idler wheel and the sprocket. In various implementations, the idler wheel provides a relatively low friction manner of returning the chain to the sprocket, such as by rotation rather than sliding movement.

SUMMARY

Conveyor systems are operated in many types of environments, some of which are cleaner than others. In many environments, conveyor systems are exposed to myriad contaminants (e.g., dirt, debris, organic material, product, etc.). Such contaminants can accelerate wear and tear on the conveyor components, which can reduce the life of those components. For example, contaminants can corrode and/or act as abrasives on the conveyor components, thereby causing physical damage and premature wear. If left untreated, the damage to the components can lead to a reduction in the capability of the components and/or failure of the components.

Damage to the conveyor components can be increased, more rapid, and/or otherwise exacerbated when contaminants are present between components that move relative to each other. In conveyor systems, components that move relative to each other are, for example, those components that transfer power from one component to the other, such as at the interface between the sprocket and the chain. For brevity, this disclosure refers to "conveyor chains" or "chains," however, in each instance, conveyor belts (e.g., single track or modular) can be used as well. When contaminants are present at such an interface, the engagement of the chain and the sprocket can cause the contaminants to grind, chew, abrade, and/or otherwise mar one or both of the components. Thus, the presence of contaminants between components that move relative to each other can damage and/or shorten the life of one or both components (e.g., the sprocket and the chain).

Furthermore, the damage to the components, and even the presence of the contaminants themselves at the interface, can increase the friction between the components. This increase in friction can increase the power needed to drive the conveyor system, thereby causing waste, creating heat, increasing costs, and/or generating increased wear. In certain implementations, the increased friction can lead to instability in one or more components of the conveyor system and/or in the conveyed product (e.g., bottles). For example, the increased friction can result in vibrations, one or more of the components becoming unbalanced, and/or other issues. In some implementations, such as in bottle processing facilities (e.g., breweries or the like), instability in the conveyed product can result in damage to the product container (e.g., a bottle or can), loss of contents (e.g., spillage of liquid in the bottle or can), and/or disruption of the processing line (e.g., an overturned or otherwise misplaced container can prevent or inhibit injection of material into the container and/or passage of other containers).

Typically, to repair or replace a worn or damaged component, such as a sprocket, at least some of the conveyor system is stopped, de-energized, and/or shut-down. This can be problematic and disruptive to the flow of product, such as in a manufacturing or processing facility. Moreover, ceasing of operation of the conveyor system can inhibit or halt production, processing, or other handling of the conveyed product, which can result in lost time and money. Further, re-starting a conveyor system can be difficult and can cause additional wear on system components (e.g., due to the force needed to overcome the system being at rest). Repair or replacement of certain conveyor components can also be difficult to arrange because it may require a person with specialized training to properly mount and test the components.

To ameliorate and/or solve some of the problems mentioned above, or other problems, some embodiments include a driving device, such as a sprocket, and/or a guiding device, such as an idler wheel or roller, that is configured to facilitate the evacuation of contaminants from the conveyor system. For example, in some embodiments, the sprocket and/or idler wheel has a plurality of openings that facilitate the evacuation of dirt and debris from the sprocket and/or idler wheel.

In some embodiments, the sprocket and/or idler wheel is designed to be generally open. In certain implementations, the sprocket and/or idler wheel contains certain design features that allow debris to readily escape the interface of the sprocket and/or idler wheel and the chain. In some embodiments, the open structure configuration retains high mechanical strength and integrity. In various embodiments, the sprocket and/or idler wheel are configured to allow cleaning liquids to readily pass through the sprocket and/or idler wheel.

Several illustrative embodiments are disclosed in this specification. Any feature, structure, or step disclosed in connection with any embodiment can be replaced with or combined with any other feature, structure, or step disclosed in connection with any other embodiment, or omitted. Further, for purposes of summarizing the disclosure, certain aspects, advantages, and features of the inventions have been described herein. However, not all embodiments include or achieve any or all of those aspects, advantages, and features. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Any features, structures, components, materials, and/or steps of any of the embodiments can be combined or replaced with any features, structures, components, materials, and/or steps of any other of the embodiments to form additional embodiments, which are part of this disclosure.

FIGS. 1B-1D are perspective views of the first portion of the sprocket of FIG. 1.

FIG. 1E is a perspective drawing of another embodiment of a sprocket with apertures including a first portion and a second portion.

FIG. 1F is a side view of the sprocket of FIG. 1E.

FIGS. 1I-J are cross-sectional views of the sprocket of FIG. 1E.

FIG. 3B is a front view of the sprocket of FIG. 3A.

FIG. 3C is a cross-sectional view of the sprocket of FIG. 3B.

FIG. 3D is a cross-sectional view of the sprocket of FIG. 3C.

FIG. 3E is a side view of the sprocket of FIG. 3A.

FIG. 3F is a cross-sectional view of the sprocket of FIG. 3E.

DETAILED DESCRIPTION

Figure 1A:
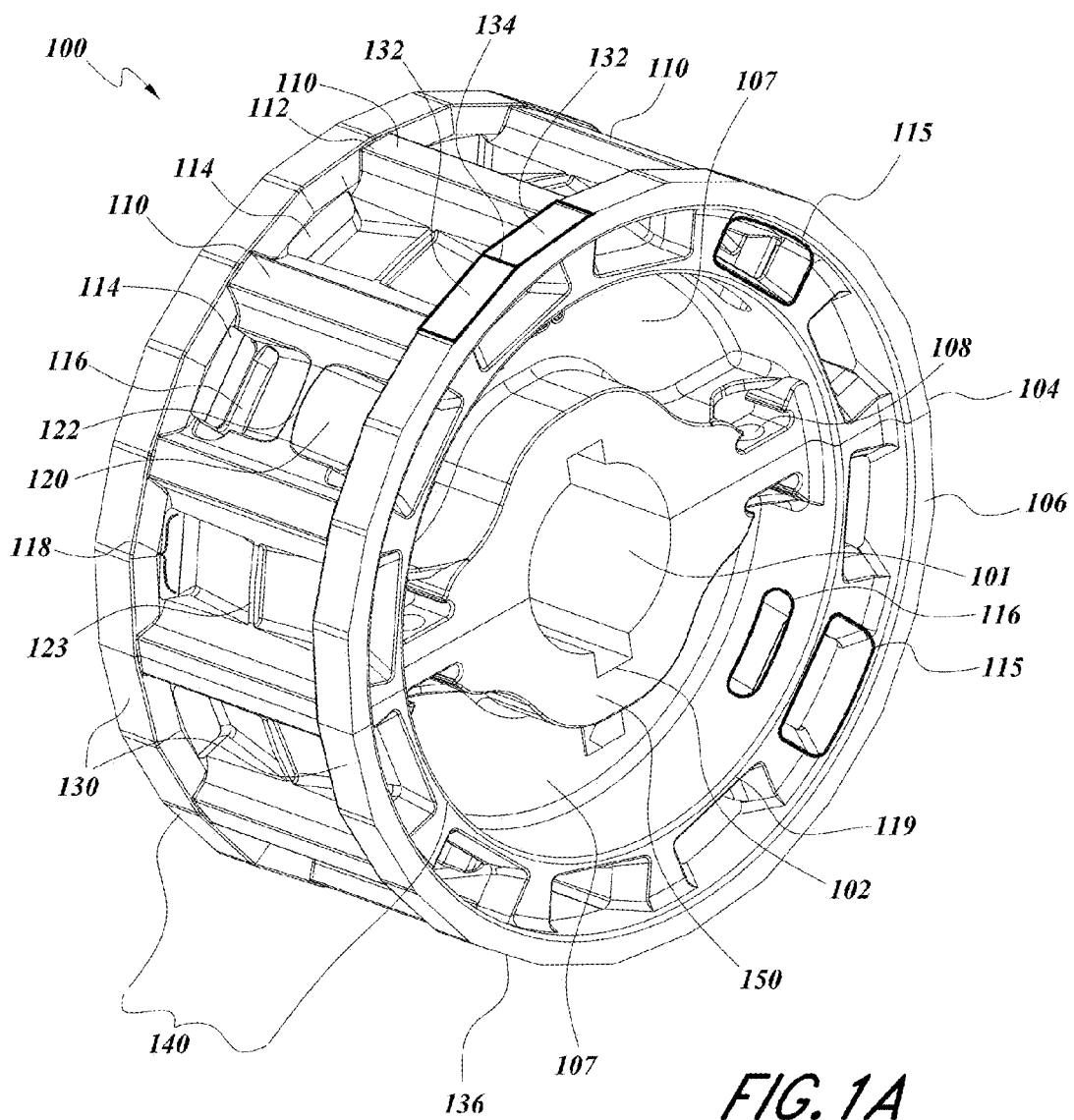
FIG. 1A is a perspective view of an embodiment of a sprocket with apertures including a first portion and a second portion.

Certain embodiments of sprockets and idler wheels are described below to illustrate various examples that may be employed to achieve one or more desired improvements. These examples are only illustrative and not intended in any way to restrict the general inventions presented and the various aspects and features of these inventions. The phraseology and terminology used herein is for the purpose of description and should not be regarded as limiting. No features, structure, or step disclosed herein is essential or indispensable.

Illustrative Sprocket Embodiments

FIGS. 1A-D illustrate an embodiment, and/or parts of an embodiment, of a sprocket 100 that can engage a conveyor chain. As noted above, although this disclosure refers to "conveyor chains" or "chains," in each instance conveyor belts (e.g., single track or modular) can be used as well. The illustrated examples of a sprocket 100 include features designated by the numbers used herein. However, these features need not be present in all embodiments.

As noted above, the sprocket 100 can be rotatably driven. In some embodiments, the sprocket 100 has a drive engagement portion 101, such as a recess, a surface feature, or an aperture, that is configured to engage a drive implement (not pictured), such as an axle or drive shaft. In various embodiments, the drive engagement portion 101 has a corresponding shape to the drive implement. For example, some drive implements have a generally circular cross-sectional shape, and the drive engagement portion 101 can have a corresponding shape, such as is illustrated. Certain drive implements have a generally rectangular (e.g., square) cross-sectional shape, and the drive engagement portion 101 can have a corresponding shape.

One or more drive ridge recesses 102, such as keyways, can be configured to match one or more features (e.g., ridges) on the drive implement. In some embodiments, the drive implement may be inserted into the drive engagement portion 101 where the coinciding ridge of the axle can engage the drive ridge recess 102. In some embodiments, the drive ridges engage the sprocket 100 via the drive ridge recesses 102 to allow forward or reverse rotation along the circumferential axis of the sprocket 100. In various embodiments, a hub 150 comprises the drive engagement portion 101 and the drive ridge recesses 102.

In some embodiments, the sprocket is a single unitary component. In other embodiments, such as in the embodiment illustrated, the sprocket 100 is made up of multiple components, such as a first sprocket half 104 and a second sprocket half 106. In some embodiments, the first sprocket half 104 and the second sprocket half 106 are semicircular in shape. In certain variants, the first sprocket half 104 and the second sprocket half 106 are substantially identical. In some implementations, the first sprocket half 104 and the second sprocket half 106 are different in one or more ways. In some embodiments, the first sprocket half 104 and the second sprocket half 106 are configured to align (e.g., front-to-back and side-to-side) over an axle. Such multi-piece sprocket 100 designs can facilitate retrofitting of conveyor systems by allowing the first and second halves to be installed on an axle radially, rather than being slid onto the axle longitudinally.

In certain embodiments, the first sprocket half 104 and the second sprocket half 106 can be fastened together to form the sprocket 100. In some embodiments, the first sprocket half 104 and the second sprocket half 106 have two or more fastener recesses 108 (e.g., threaded or non-threaded holes). In some variants, the fastener recesses 108 are configured to engage fasteners (e.g., bolts, clips, rivets, pins, or the like; not pictured). In some embodiments, the fasteners secure the sprocket halves 104, 106 together via the fastener recesses 108 to link the sprocket 100 to the axle via the drive engagement portion 101. As illustrated, certain variants of the fastener recesses 108 extend generally perpendicular to a longitudinal axis (e.g., the axis of rotation) of the sprocket 100. In some embodiments, the fastener recesses 108 extend generally parallel to the longitudinal axis. In some implementations, as shown in FIG. 1, the sprocket 100 has four fastener recesses 108. In some embodiments, each sprocket half can have one, two, three, four, or more fastener recesses 108. In certain embodiments, each fastener recess 108 is configured to hold at least one fastener. In some embodiments, the sprocket halves 104, 106 are configured to engage each other without the use of fasteners. In some embodiments, the sprocket halves 104, 106 include mating features (e.g., lock-and-key features) that allow the halves 104, 106 to directly engage each other. In some embodiments, the sprocket halves 104, 106 include features that allow each half 104, 106 to clip, link, or snap together.

Figure 1B:
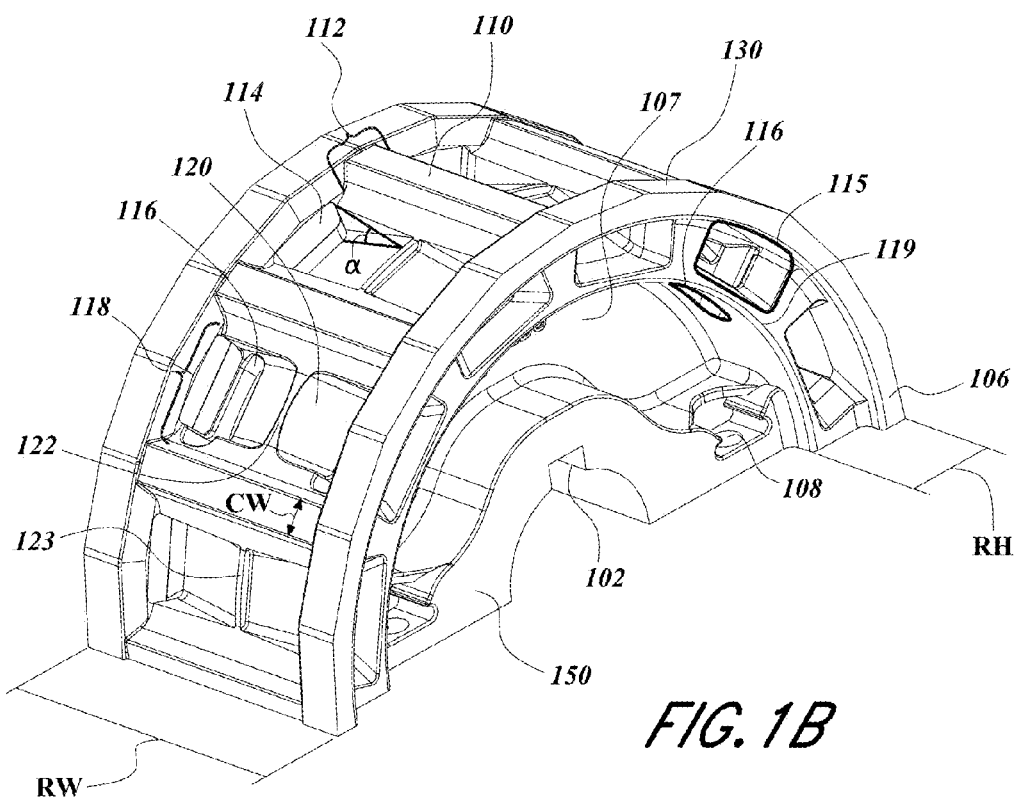

With continued reference to FIGS. 1A-D, the sprocket 100 can include a tooth ring 140, which is connected with the hub 150 via a sprocket body 107. In some embodiments, the tooth ring 140 comprises some or all of a circumferential periphery of the sprocket 100. As shown in FIGS. 1B and 1C, the tooth ring 140 can have a radial height RH and a longitudinal width RW.

In certain implementations, the tooth ring 140 has a plurality of torque transmitting portions, such as teeth 110. The teeth can be configured to engage with a conveyor chain, such as by being received in corresponding voids or recesses in the chain. In some embodiments, the teeth 110 are circumferentially separated by a plurality of seats 118. For example, two adjacent teeth 110 can be separated by a seat 118. The seats 118 and the teeth 110 can reside on and/or be supported by a circumferentially extending support structure 119.

In some embodiments, the tooth ring 140 includes a circumferentially-extending rail or flange 130 and a portion of the teeth 110 are connected to and/or supported by the circumferentially-extending rail or flange 130. In various implementations, the sprocket 100 includes a plurality of flanges 130. For example, in the embodiment shown, the sprocket 100 includes two longitudinally spaced apart flanges 130. In some embodiments, the flanges 130 are the parts of the sprocket 100 that extend the furthest in the longitudinal direction, relative to the longitudinal midpoint of the sprocket 100. As shown, the flanges 130 can comprise the radially outermost portion of the sprocket 100. The flange 130 can define a periphery 136 of the sprocket 100.

In some embodiments, the teeth 110 each have a radially outward crest face 111, which is indicated by a cross-hatched area in FIG. 1C. The crest face 111 can have a surface that is generally flat or curved (e.g., forms a portion of a cylindrical shape), which can aid in transmitting torque, facilitate engaging the teeth 110 with the corresponding portions on the chain, or otherwise. In some embodiments, the crest face 111 of the teeth 110 is configured (e.g., shaped) to increase the surface area in contact between the sprocket 100 and the chain, thereby reducing stress on one or both components during torque transfer. In certain embodiments, the ratio between a circumferential width CW (see FIG. 1B) of the crest face 111 and the diameter of the sprocket is at least about: 1:10, 1:16, 1:20, 1:32, 1:36, values in between the aforementioned values, and otherwise.

In some implementations, the surface of the crest face 111 is positioned on a plane that is tangential to the circumferential axis of the sprocket 100. In certain variants, the surface of the crest face 111 is on a plane that is at an angle to that tangential plane. For example, the surface of the crest face 111 can be angled such that a leading edge of the crest face 111 is lower than a trailing edge, which can facilitate engagement between the teeth 110 and the chain. In some embodiments, the crest face 111 of the teeth 110 is recessed radially inward relative to an outer peripheral surface of the flange 136. In some embodiments, the teeth 110 protrude radially outwardly relative to the outer peripheral surface of the flange 136. For example, the crest face 111 can be positioned radially outward of the flange 136.

As illustrated, the teeth 110 can have sides that connect at the crest face 111 and descend into the seat 118. In some embodiments, the sides are curved (e.g., concave or convex). For example, certain variants of the seat 118 have curved sides with the same or different radii of curvature. Some embodiments of the seat 118 have a fillet on one or both of the sides. In some embodiments, the sides are substantially straight (e.g., linear). In certain embodiments, the crest face 111 and sides define a polygonal tooth region 112, as shown in FIGS. 1A-C. In some embodiments, the polygonal tooth region 112 has three sides (formed by the face and the two tooth sides). However, other polygon shapes are also envisioned (e.g., polygons with four, five, six, or more sides). In certain implementations, as illustrated, the cross-sectional shape of the polygonal tooth region 112 is generally rectangular or generally square.

In some embodiments, when the sprocket 100 is driving the chain, the crest face 111 of each tooth 110 engages (e.g., contacts) a segment of the chain so that portions of the chain rest (e.g., flushly) on or against the crest face 111 portion. In certain embodiments, the polygonal tooth region 112 is configured to fit into a receiving portion in the chain, such as a coinciding polygonal chain recess. This configuration provides a large contact surface area between the chain and the tooth 110 (e.g., the crest face 111 and/or the polygonal tooth region 112), thereby reducing stress when transmitting force between the components. In some implementations, the contact between the chain and the tooth 110 aids in displacing contaminants between the components. For example, as discussed in more detail below, the contaminants can be moved into other areas of the sprocket 100, so that the contaminants can be discharged.

In some variants, the sprocket 100 is configured to encourage debris and other contaminants to exit the sprocket 100. As such, certain implementations of the sprocket 100 can be referred to as "self-cleaning." In some embodiments, the contact between the teeth 110 of the sprocket 100 and the chain can direct the debris and contaminants to migrate toward the seat 118 and/or toward open spaces—which are discussed in more detail below—for clearing from the sprocket 100. Thus, the debris and contaminants can be evacuated from the sprocket/chain interface, thereby extending the life of the components, reducing down-time, increasing efficiency, decreasing friction, and/or providing other benefits. In some embodiments, the interface between the sprocket 100 and the chain cleans the conveyor system (e.g., removes one or more contaminants). In certain variants, the large contact surface area can reduce the specific pressure between the sprocket 100 and the chain. In certain embodiments, a lower specific pressure lessens wear in the conveyor system and increases component lifetime.

In some embodiments, the tooth ring 140 of the sprocket 100 has one or more axial passages 114. In several embodiments, the axial passages 114 provide way for dirt, debris, or other contaminants or foreign material to escape. In some variants, as debris is pushed out of the interface of the chain and the sprocket teeth 110, the debris can be distributed or directed out of one or more of the axial passages 114. In certain variants, the axial passages 114 reside within lateral portions (e.g., longitudinally front and back portions) of the tooth ring 140. Some variants of the axial passages 114 are located between the teeth 110. In some embodiments, as shown in FIG. 1A, two axial passages 114 are located between two adjacent teeth 110. Certain variants of the sprocket 100 may have zero, one, two, three, four, or more axial passages 114 between each set of the teeth 110.

The axial passages 114 may have any configuration along the tooth ring 140. In the embodiment illustrated, the axial passages 114 are generally equally spaced around the circumference of the sprocket 100. Some variants have axial openings 114 that are non-equally spaced around the circumference of the sprocket 100. In some embodiments, the axial passages 114 are positioned between alternating sets of teeth 110 (e.g., where one set of teeth 110 lacks axial openings while the next set of teeth 110 has one or more axial openings). In certain implementations, some or all of the axial passages 114 are located on one longitudinal side of the tooth ring 140. In some embodiments, each longitudinal side of the tooth ring 140 includes one or more of the axial passages 114. In certain variants, the axial passages 114 alternate from between teeth on one longitudinal side of the tooth ring 140 to between teeth on the other longitudinal side around the circumference of the sprocket 100. In some embodiments, some or the entire sprocket 100 lacks axial passages 114.

In certain implementations, the axial passages 114 each define an axial aperture 115. The axial aperture 115 can be located on a plane that is perpendicular to the longitudinal axis of the sprocket 100. In some embodiments, the size of the axial aperture 115 may change as a function of position along the longitudinal axis. For example, as shown in FIG. 1D, the axial aperture 115 may be bounded by walls in the tooth ring 140 that are not parallel with the longitudinal and/or circumferential axes, thereby changing the size of the axial aperture 115 depending on the longitudinal position.

The axial aperture 115 can include an axial aperture area 121, which is located longitudinally on the outside face of the tooth ring 140 and is indicated by a cross-hatched area in FIG. 1C. In some embodiments, the axial aperture area 121 is less than or equal to the area of the crest face 111 of the tooth 110. In some variants, the axial aperture area 121 is greater than the area of the crest face 111.

As shown in FIGS. 1A and 1B, certain embodiments of the tooth ring 140 of the sprocket 100 can have one or more radial passages 116. The radial passages 116 can intersect with the seats 118 and/or the axial passages 114. This can allow dirt, debris, or contaminants or other foreign material to escape from the tooth ring 140 and be discharged from the sprocket 100. As shown, the radial openings can be positioned through the support structure 119 (e.g., radially). Some embodiments of the sprocket 100 do not have radial passages 116.

In some embodiments, the radial passages 116 are equally positioned or distributed around the circumference of the sprocket 100. For example, the illustrated embodiment includes radial passages 116 that are generally equally circumferentially spaced apart. Some variants have radial passages 116 that are unequally positioned around the circumference of the sprocket 100. In some embodiments, the radial passages 116 are positioned between alternating sets of teeth 110 (e.g., where one set of teeth lacks radial openings while the next set of teeth has one or more radial openings) or may be between every set of teeth 110. Other variations of radial passages 116 distributions about the tooth ring 140 are also envisioned. In some embodiments, the sprocket 100 lacks radial passages 116.

In some embodiments, as shown in FIGS. 1A-D, the radial passages 116 are positioned between adjacent teeth 110. In some embodiments, one, some, or each set of adjacent teeth 110 can have zero, one, two, three, four, or more radial passages 116. In some embodiments, the radial passages 116 are located on alternating sides of the sprocket 100. For example, as shown in FIGS. 1A and 1B, a first radial passage 116 can be near or adjacent one of the flanges 130, and the next radial opening (moving around the circumference of the sprocket 100) can be near or adjacent the other of the flanges 130.

The radial passages 116 can include a radial aperture having a radial aperture area 117, as indicated by the cross-hatched area in FIG. 1D. In certain implementations, about 50% of the total of all of the radial aperture areas 117 of the sprocket 100 is located in each half of the sprocket 100. In certain implementations, at least about 55% of the total of the radial aperture areas 117 is located in one half of the sprocket 100. In some embodiments, the radial aperture area 117 is less than or equal to about the axial aperture area 121. For example, the ratio of the axial aperture area 121 to the radial aperture area 117 can be about: 30:1, 20:1, 10:1, 5:1, 1:1, 1:5, 1:10, 1:20, 1:30, ratios between the aforementioned ratios, or otherwise. Some variants of the radial aperture area 117 have an area that is less than or equal to a percentage (e.g., 30%, 40%, 50%, 60%, 70%, 80%, values in between the aforementioned values, or otherwise) of the axial aperture area 121.

In some embodiments, the flange 130 is supported by a support post 124. In certain variants, as shown in FIG. 1D, the support post 124 has a width PW, which can be is less than or equal to an axial opening width AW. For example, the ratio of the post width PW to the axial opening width AW can be about: 1:1, 1:1.5, 1:2, 1:3, 1:4, 1:5, 1:10, 1:20, 1:30, ratios between the aforementioned ratios, or otherwise. Some variants of the post width PW is less than or equal to a percentage (e.g., about: 30%, 40%, 50%, 60%, 70%, 80%, 90%, values in between the aforementioned values, or otherwise) of the axial opening width AW. Certain implementations of the sprocket 100 have a plurality of axial openings 114 and a plurality of support posts 124, such as two openings 114 circumferentially flanking each of the support posts 124.

According to some implementations, one or more of the seats 118 can include a ramp 120. The ramp 120 can be angled with respect to the longitudinal axis to encourage contaminants to move (e.g., roll, slide, or otherwise transit) down the ramp 120. In various embodiments, the contaminants are encouraged down the ramp 120 by the interaction of the sprocket 100 and the chain, by force of gravity, or otherwise. As illustrated, a lower portion (e.g., the bottom) of the ramp 120 can intersect with the axial aperture 115. This can permit contaminants to readily move down the ramp 120 and out the axial aperture 115. In some embodiments, the lower portion of the ramp 120 intersects with one or more of the radial passages 116, thereby facilitating contaminants moving down the ramp 120 to pass out of the sprocket 100 via the radial passages 116.

In some embodiments, the ramp 120 facilitates ejection of contaminants during engagement of the sprocket 100 and the chain. During such engagement, the amount of contact between the sprocket 100 and chain progressively changes. For example, the amount of surface area of a given one of the teeth 110 that is in contact with the chain can progressively increase and/or decrease. In certain implementations, during the progressive increase in contact between the tooth 110 and the chain, contaminants on the tooth 110 and/or on the chain can be squeezed or otherwise urged out from between the components, or otherwise encouraged to be discharged from the components, such as by the contact pressure between the components. The contaminants can then be directed, for example, along or down the ramp 120 and through the axial and/or radial passages 114, 116, thereby discharging the contaminants from the conveyor system.

Discharging of contaminants can reduce the chance of damage to the sprocket 100 and chain. For example, removal of dirt or other contaminants can reduce abrasion or wear on the sprocket 100 and/or chain. Moreover, when the contaminants are discharged, they can be physically separated from the conveyor system, thus rendering the conveyor system cleaner. Accordingly, some implementations of the conveyor system (and components thereof) are configured to not only reduce damage because of wear caused by the contaminants, but also to clean one or more components of the conveyor system. In certain embodiments, this "self-cleaning" feature of the sprocket 100 occurs automatically, passively, and/or continuously during operation of the conveyor system.

In various embodiments, mud (e.g. any accumulation of debris, discarded materials, or other contaminants) located in the conveyor chain can be removed by engaging the chain with the rotating sprocket 100. As discussed above, such engagement causes the mud to be discharged from the chain either directly into the surrounding environment or into the sprocket 100. The mud that is discharged into the sprocket 100 can in turn be conveyed down the ramp 120 and/or through the passages 114, 116, and thus be discharged from the sprocket 100. Accordingly, the mud can be cleaned from both the chain and the sprocket 100.

As illustrated in FIG. 1B, in some embodiments, the ramp 120 has an angle α in relation to a line parallel to the longitudinal axis. In certain embodiments, the angle α determines the steepness of the ramp 120. In certain embodiments, the angle α may be about: 1°, 3°, 5°, 10°, 15°, 20°, 25°, 30°, 35°, 45°, values between the aforementioned values, and otherwise.

In some embodiments, one or more of the seats 118 includes a plurality (e.g., two) ramps 120 connected by a ramp apex 122. As noted above, in some variants, the ramps 120 direct debris from between the teeth 110 out through the axial passages 114 and/or radial passages 116. In some embodiments, the ramp apex 122 is located about equidistant from the flanges 130. A ramp apex 122 that is about equidistant from the flanges 130 can aid in distributing (e.g., about equally) debris to the ramps 120 and/or through the axial passages 114 and/or the radial passages 116. In some embodiments, the ramp apex 122 can be located closer to one flange than the other along the longitudinal axis, such that each ramp within a given seat 118 is a different length along the longitudinal axis. In some embodiments, the ramp apex 122 may be located adjacent to one of the flanges within the longitudinal axis, such that only one ramp 120 exists in a given seat 118. In some embodiments, any configuration of ramps 120 can be mixed and matched, such that adjacent seats 118 may have an equivalent or different ramp orientation. In some variants, the ramp apex 122 has a generally hourglass shape (e.g., two wide regions with a narrow region in between the wide regions) facing radially outwardly, as shown in FIG. 1B.

In some embodiments, one or more of the seats 118 includes a plurality (e.g., two) ramps 120 connected with a directing member, such as a ridge 123. In some embodiments, the ridge 123 is configured to direct and/or divide portions of debris, such as directing the debris to a ramp 120 on one side of the sprocket 100 or the other. In some embodiments, the ridge 123 has a dispersion portion (e.g., an edge) that can cut, compress, or otherwise reduce the size of large particles of debris. In some embodiments, the edge of the ridge 123 can pulverize or otherwise diminish the size of debris particles into sizes that can be better distributed through the axial passages 114 and/or radial passages 116. Certain variants of the ridge 123 are configured to support the chain during engagement of the sprocket 100 and the chain.

As previously discussed, the sprocket 100 can have multiple teeth 110. Certain sprockets have an odd number of teeth that are circumferentially spaced apart, which results in only every other tooth 110 engaging the chain during each rotation of the sprocket 100. In some embodiments, as shown in FIG. 1A, the sprocket 100 can have an even number of teeth 110. For example, one tooth can be removed from the aforementioned sprocket with an odd number of teeth (and the teeth circumferentially redistributed). This redistribution can result in additional circumferential space between each tooth 110 and an increase in the circumferential width of the seat 118. In certain embodiments, the larger width of the seat 118 can accommodate larger axial passages 114 and/or radial passages 116, which can increase the capacity and/or ability of the sprocket 100 to remove contaminants.

Generally, on a sprocket 100 with an even number of teeth, each tooth 110 will engage the chain on each revolution of the sprocket 100. This can increase the rate and/or quantity of debris being discharged from the interface of the sprocket 100 and chain because there is continuous interaction between the chain and the teeth 110 (instead of on every other rotation). This continuous removal of debris can increase the life of the sprocket 100 by lowering the amount of friction and abrasion. In certain embodiments, the removal of debris from the interface of the sprocket 100 and chain inhibits or prevents chain slippage and/or aids smooth chain travel.

In certain embodiments, as an addition or an alternative to the polygonal tooth 112 design discussed above, other features of the sprocket 100 can be configured to vary the amount of the interface between the sprocket 100 and the chain. For example, the flange 130 can be configured to vary the amount of contact between the outer radial surface of the flange 130 and the chain. For example, in some variants, the flange 130 has a plurality of faces 132, so is called a "polygonal flange" herein. Some or each of the flange faces 132 can be located on a plane tangential to the circumferential axis. In some embodiments, the radially outer surface of the tooth 110 is angled relative to the face 132. For example, as shown, the radially outer surface of the tooth 110 can connect with an apex between faces 132. In certain embodiments, the radially outer surface of the tooth 110 is substantially flush with a flange face 132 of the polygonal flange 130. In some embodiments, this configuration can improve the performance of the sprocket 100 by creating additional surface area between the belt and the polygonal flange 130.

In certain embodiments, the faces 132 of the polygonal flange 130 contact each segment of the chain so that flat portions of the chain engage (e.g., rest on, abut, or otherwise) the flange faces 132 of the polygonal flange 130. This configuration can provide increased contact surface area between the chain and the polygonal flange 130, which can facilitate the above-noted cleaning of the system. In some embodiments, the increased contact surface area reduces the specific pressure between the sprocket 100 and the chain. In some variants, the reduction in specific pressure results in less wear on the conveyor system and longer component lifetime. In some implementations, the polygonal flange 130 helps distribute the forces exchanged between the sprocket 100 and the chain.

The polygonal flange 130 can be adjusted to provide different sprocket 100 performance. In some embodiments, as the number of faces 132 increases, the pressure between an individual face 132 and the chain decreases and/or the smoothness of the engagement between the sprocket 100 and the chain increases. For instance, if a smoother connection between the chain and the sprocket 100 is desired, the polygonal flange 130 can include a greater number of faces 132. In some embodiments, the total number of faces 132 on the polygonal flange 130 is greater than or equal to 6, 8, 10, 12, 14, 16, 18, 20, 30, or 40.

In certain variants, the increased contact surface area allows additional debris to be pushed from the interface of the polygonal flange 130 and the chain into other portions of the sprocket 100 for removal, such as the ramp 120, axial aperture 115, and/or radial aperture 116. This interaction can help clean the conveyor system, thereby extending the life of the components.

In some embodiments, each flange face 132 connects to an adjacent flange face at a flange face apex 134. As shown, the flange face apexes 134 can form the outer periphery 136 of the tooth ring 140. In certain variants, the periphery 136 is located on a plane perpendicular to the longitudinal axis and has a geometric center substantially coinciding to the longitudinal axis of the sprocket 100.

In some embodiments, the internal surface of the support structure 119 defines an inner circumference of the tooth ring 140. The inner circumference of the tooth ring 140 can be located on a plane perpendicular to the longitudinal axis and have a geometric center substantially coinciding to the longitudinal axis of the sprocket 100. In some embodiments, the tooth ring 140 includes an annular radial area between the perimeter 136 and the inner circumference of the tooth ring 140. This annular area can be called a tooth ring area. In certain variants, the tooth ring area and the axial aperture areas 121 are approximately coplanar. In some implementations, the tooth ring area is greater than the sum of the axial aperture areas 121. For example, the ratio of the sum of the axial aperture areas 121 in one of the tooth rings 140 compared to the tooth ring area of that tooth ring 140 can be at least about: 1:1.2, 1:1.4, 1:1.6, 1:1.8, 1:2, 1:3, 1:4, 1:5, 1:10, 1:15, 1:20, 1:25, 1:30, 1:40, 1:50, ratios between the aforementioned ratios, or otherwise.

As noted above, in some embodiments, the sprocket 100 includes a hub 150. As shown in FIG. 1D, the hub 150 of the sprocket 100 has a width HW along the longitudinal axis. As shown in FIGS. 1B-D, the tooth ring 140 width RW is along the longitudinal axis. In some embodiments, the width RW of the tooth ring 140 is larger than the width HW of the hub 150. This configuration can allow debris exiting via the axial passages 114 and/or radial passages 116 to be discharged (e.g., fall by gravity) beyond the hub 150, thereby reducing the chance of the debris accumulating on the hub 150 and/or reducing wear on the hub 150 and axle. Many variations of the ratio between the width RW of the tooth ring 140 and the width HW of the hub 150 are contemplated. For example, the ratio of the width RW of the tooth ring 140 to the width HW of the hub 150 can be at least about: 1.0:1.0, 1.1:1.0, 1.2:1.0, 1.3:1.0, 1.4:1.0, 1.5:1.0, 1.6:1.0, 1.7:1.0, 1.8:1.0, 1.9:1.0, 2.0:1.0, 3.0:1.0, 4.0:1.0, ratios between the aforementioned ratios, or otherwise. In some embodiments, the axial passages 114 and/or radial passages 116 are axially offset from an axial end of the hub. This can aid is ensuring that contaminants discharged through the axial passages 114 and/or radial passages 116 are discharged beyond (e.g., spaced apart from) the axial end of the hub. In certain embodiments, contaminants discharged from the axial passages 114 and/or radial passages 116 do not contact the hub.

FIGS. 1E-H show another embodiment of a sprocket 100a. The sprocket 100a can have one or more of the above features or combinations of features described for sprocket 100. Sprocket 100a may be identical or similar to the sprocket 100 discussed above in many respects. Like features for sprocket 100a, as shown in FIGS. 1E-1H, carry an "a" indicator to identify some of the corresponding features of sprocket 100. For example, the drive engagement portion 101 of sprocket 100 is indicated by a 101 designation, while the corresponding drive engagement portion 101a of sprocket 100a is indicated by a "101a" designation. As with all embodiments disclosed herein, any feature, structure, step, or material disclosed and/or illustrated elsewhere in this specification can be used in addition to or instead of those in the embodiments of FIGS. 1E-H. The same labeling conventions pertain to different embodiments of the idler wheels described below (e.g., 200, 200a, 200b, 200c, etc.).

In some embodiments, the sprocket 100a has a round flange 130a (e.g., not polygonal) forming the periphery 136a of the sprocket 100a. For example, as shown in FIG. 1F, the flange 130a can be generally circular. In some implementations, this can provide a smoother engagement between the sprocket 100a and the chain, compared to a polygonal flange.

Figure 1G:
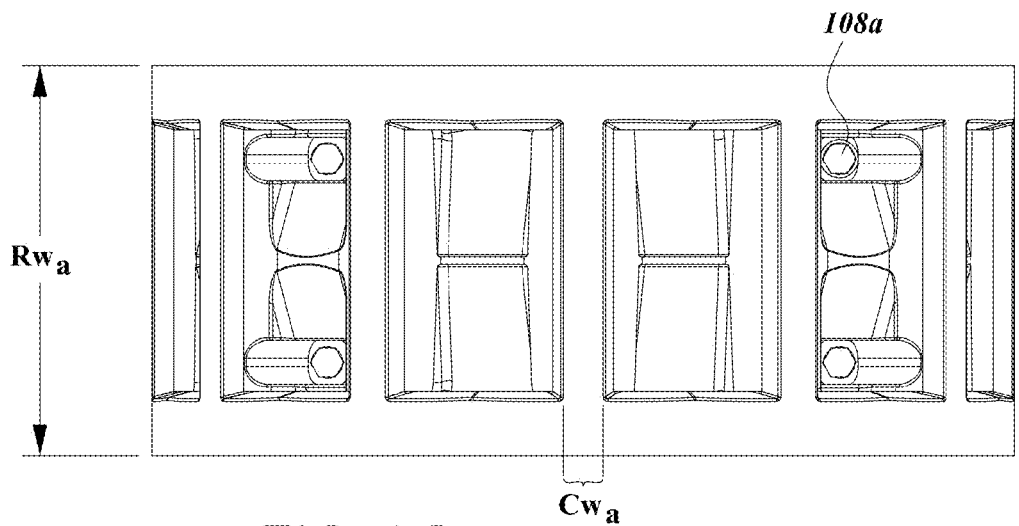
FIGS. 1G-H are circumferential views of the sprocket of FIG. 1E.
Figure 1H:
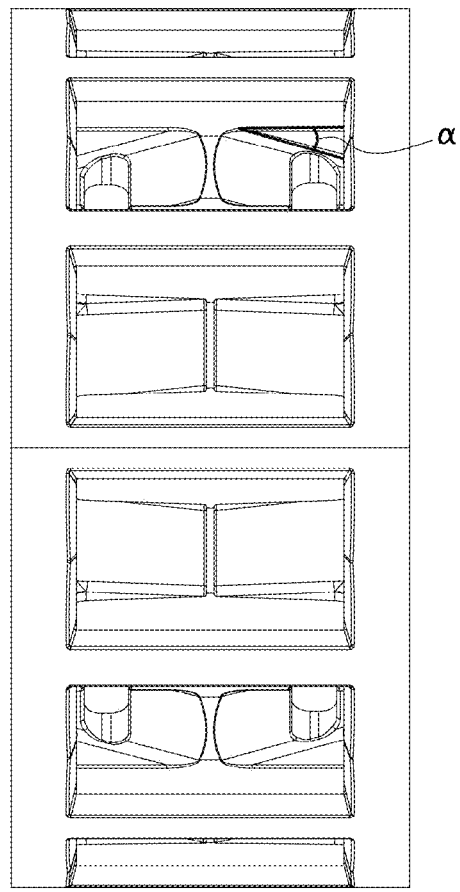
Figure 11:
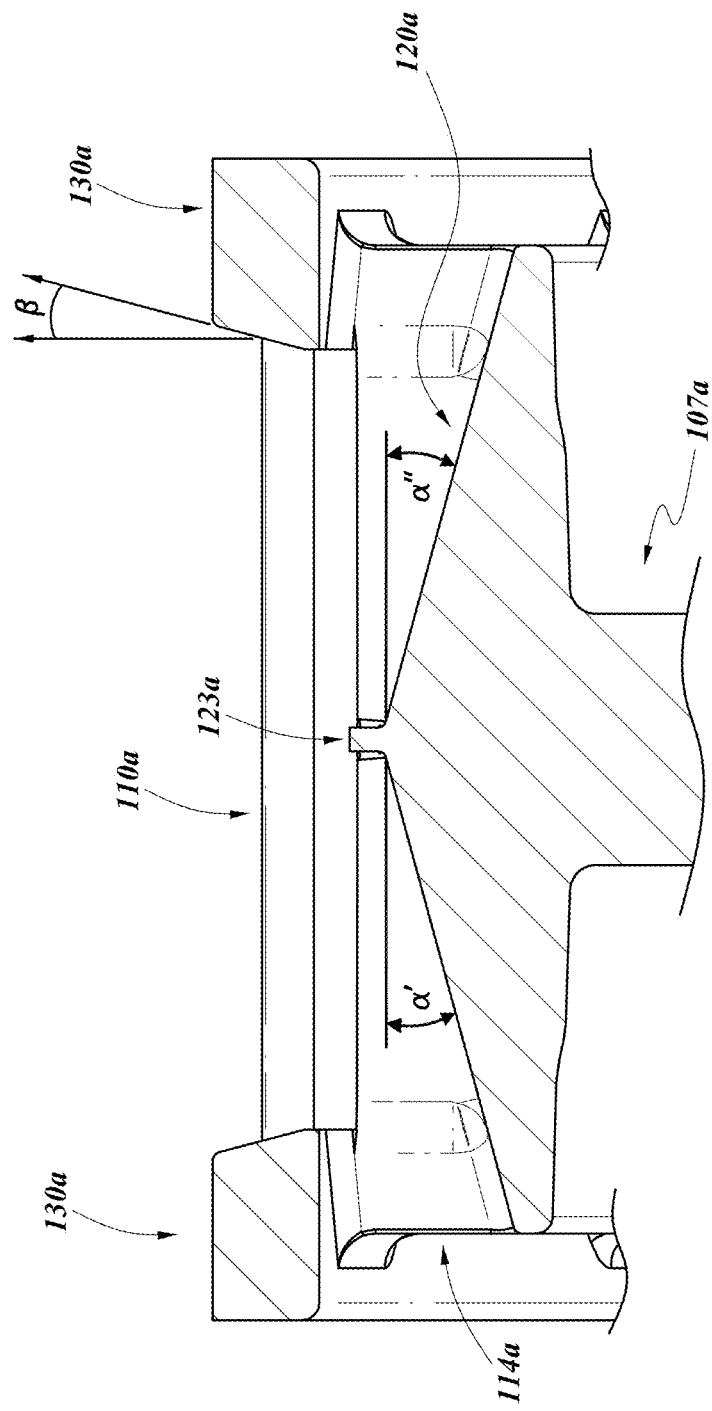

In some embodiments, as shown in FIGS. 1E-1G, the teeth 110a of the sprocket 100a may be substantially flush with the periphery 136 of the flange 130a. In some embodiments, the teeth 110a can be radially inset from the round flange 130a such that the teeth 110a are not flush with the round flange 130a. For example, the top of the tooth 110a can be radially inwardly or radially outwardly offset from the periphery 136a of the flange 130a. In some embodiments, the offset is at least about: 1 mm, 3 mm, 5 mm, 10 mm, values between the aforementioned values, or otherwise.

In certain implementations, the flange 130a forms an angle β with a line drawn perpendicular from a transversely oriented tooth surface. In some variants, the angle β is less than or equal to about: 1°, 5°, 10°, 15°, 20°, 30°, 45°, values between the aforementioned values, or otherwise. In some embodiments, the greater the β angle, the wider the mouth (e.g., opening) between the longitudinally flanking flanges 130a. In some variations, the wider mouth assists in guiding the belt or chain onto the sprocket 100a. Additionally, in some embodiments, angled configurations (e.g., of flanges, etc.) may be advantageous during the fabrication of the sprocket 110. For instance, in certain variants, an injection molded sprocket having one or more angled features is more easily removed from a mold. In certain implementations, the eased removal can increase the yield of sprockets during fabrication by lowering the discard rate of defective sprockets.

In certain variants, the flange is substantially perpendicular to the tooth surface. In some embodiments, this configuration may allow efficiency in removing contaminants from the sprocket. For instance, contaminants can be trapped by the belt as it enters the flanges and contaminants may then be forced out of any axial or radial apertures by the motion of the belt or chain.

In some embodiments, the sprocket 100a includes ramps 120a. As shown in FIG. 1I (a cross-sectional cut through Plane 1I-1I of FIG. 1F), the ramps 120a can be at an angle α with respect to the longitudinal axis of the sprocket 100a. For example, the angle α' can be at least about: 5°, 10°, 15°, 20°, 30°, 45°, values between the aforementioned values, or otherwise. In some embodiments, the greater the angle α, the more likely dirt or contaminants are to travel down the ramp by force of gravity. As shown, the ramp 120a can intersect with an axial passage 114a to facilitate discharge of material from the sprocket 100a. In some variants, the ramp 120a intersects with a radial passage (not shown).

In some embodiments, the sprocket 100a includes another ramp 120a with an angle α". The angle α" can be the same as α' or different than α'. For example, α" can be less than or equal to α'. In some variants, the difference between α' and α" is less than or equal to about: 1°, 2°, 5°, 10°, values between the aforementioned values, or otherwise.

Illustrative Idler Embodiments

Figure 2A:
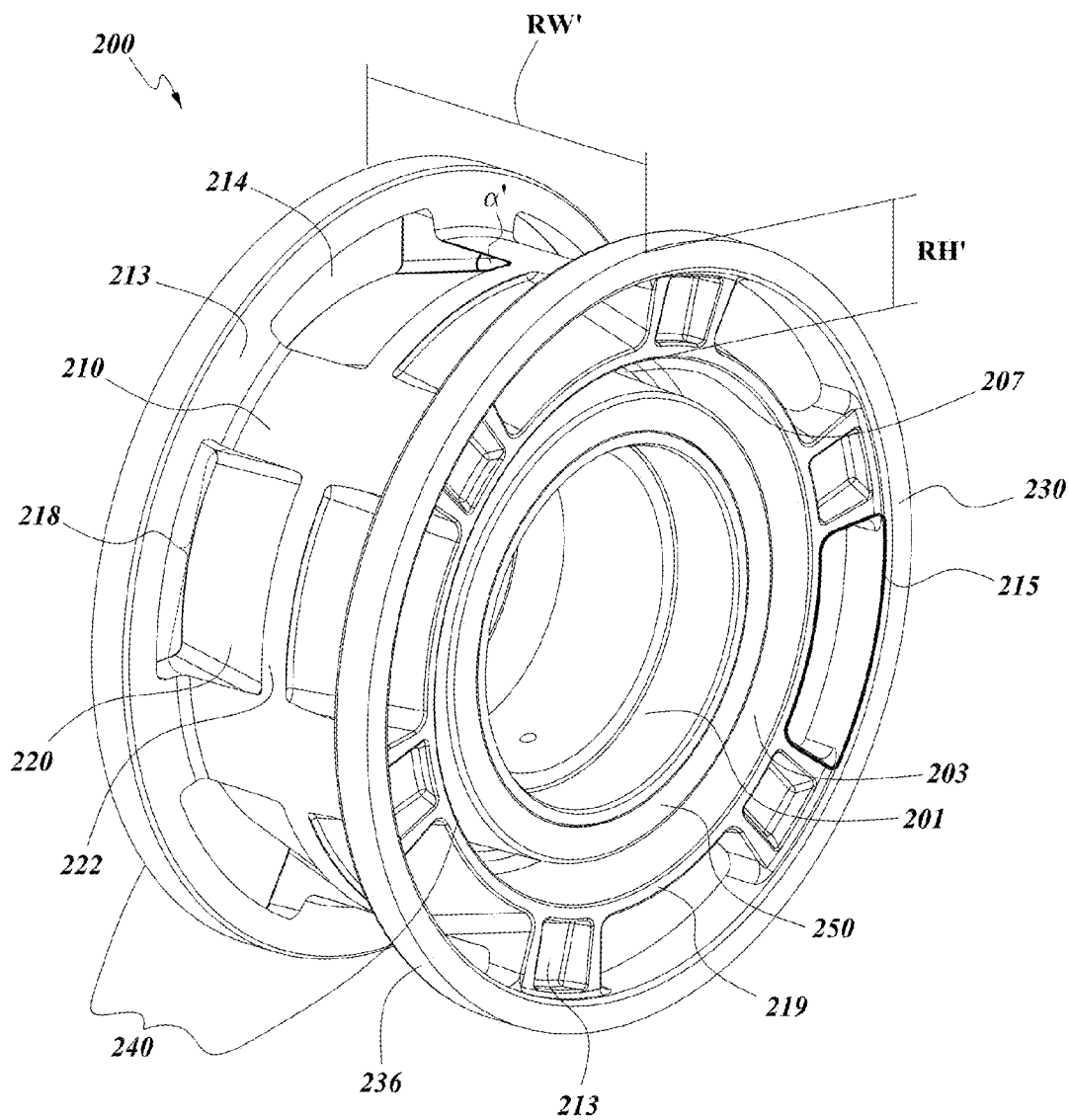
FIG. 2A is a perspective view of an embodiment of an idler wheel.
Figure 2B:
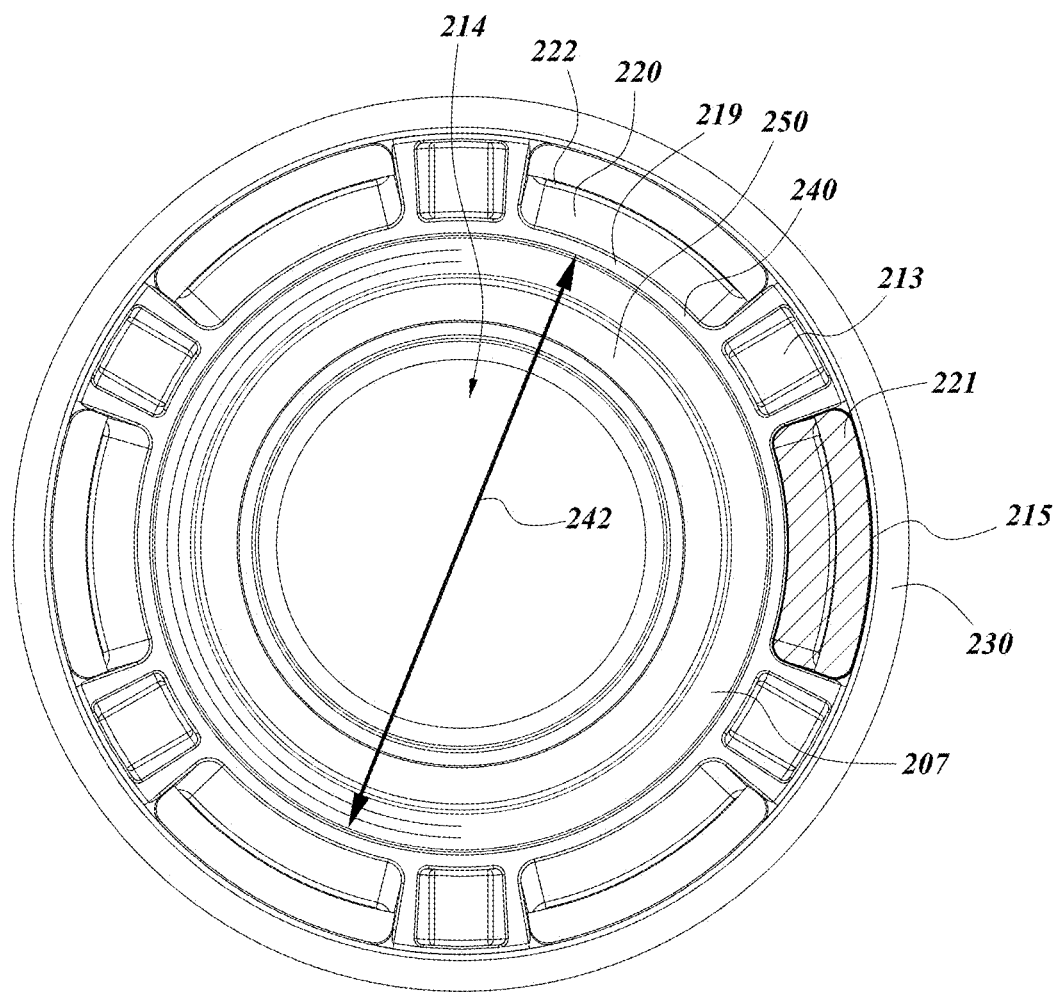
FIG. 2B is a side view of the idler wheel of FIG. 2A.
Figure 2C:
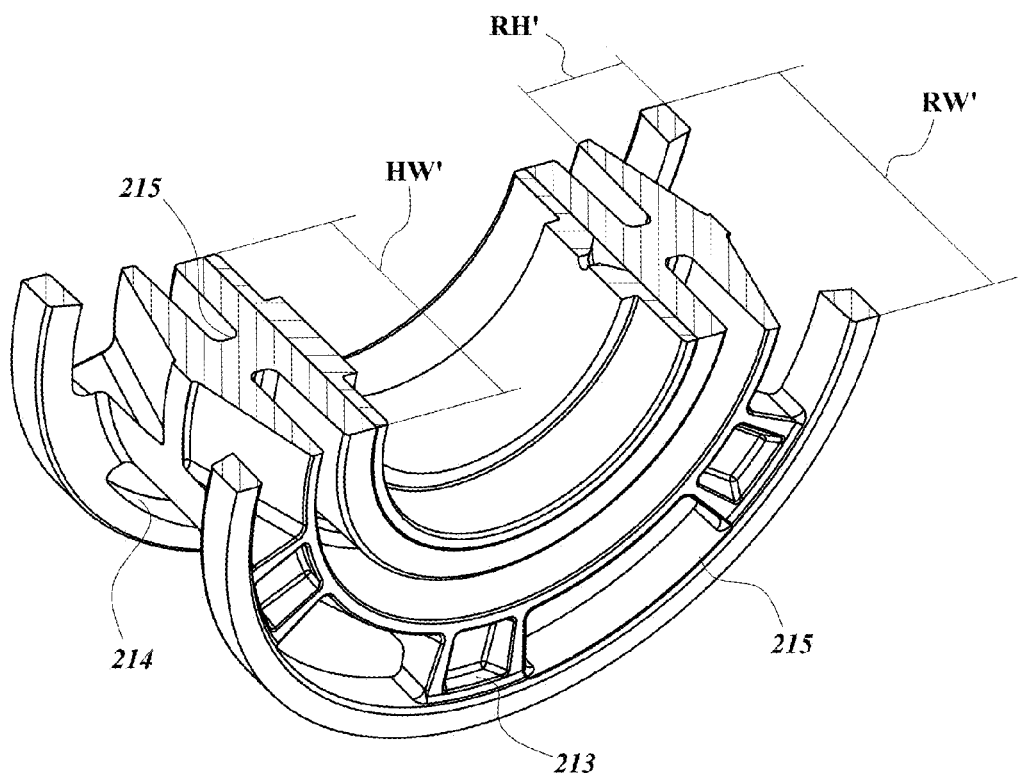
FIG. 2C is a perspective cross-sectional view of the idler wheel of FIG. 2A.

With regards to FIGS. 2A-C, an embodiment of an idler wheel 200 is illustrated. The idler wheel 200 can be similar, or identical, to the sprocket 100 described above in some ways. As such, the idler wheel 200 can include any component, portion, or characteristic (either individually or in combination) of the sprocket 100. Nevertheless, the idler wheel 200 can differ from the sprocket 100 in certain respects, some of which are discussed below.

In some embodiments, the idler wheel 200 includes "self-cleaning" functionality and/or has a generally open configuration. For example, the idler wheel 200 can have axial passages 214 and/or radial passages (not shown), which can be configured to facilitate the removal of debris and other contaminants. In some embodiments, the idler wheel is a single unitary component, as shown in FIG. 2A. In other embodiments, the idler wheel is made up of multiple components, such as a first idler portion (e.g., a first half portion) and a second idler portion (e.g., a second half portion), similar to that described above for the sprocket 100.

In some embodiments, each of the axial passages 214 include an axial aperture area 221, which is indicated by the cross-hatched area in FIG. 2B. The axial aperture area 221 can be similar in form and function to the axial aperture area 121 discussed above. In certain variants, each of the radial passages include a radial aperture area (not shown). The radial aperture area can be similar in form and function to the radial aperture area 117 discussed above. In some embodiments, the axial aperture area 221 is larger than the radial aperture area. For example, the ratio of the axial aperture area 221 to the radial aperture area can be about: 30:1, 20:1, 10:1, 5:1, 1:1, 1:5, 1:10, 1:20, 1:30, ratios between the aforementioned ratios, or otherwise.

In various embodiments, the axial passages 214 and/or radial passages are positioned between support members, such as struts 210. The struts 210 can extend longitudinally along a portion of a tooth ring 240 of the idler wheel 200, and can provide strength and/or rigidity. Because the idler wheel 200 generally does not deliver power to the chain, the struts 210 are typically fewer in number, circumferentially and/or longitudinally wider, and/or radially shallower than the teeth 110 of the sprocket 100. This can ease manufacturability of the idler wheel 200 and/or decrease the potential area into which debris can accumulate on the idler wheel 200.

As shown in FIG. 2A, the struts 210 can be included in a support ring 240, which can support and/or guide the chain during engagement with the idler wheel 200. Some variants of the support ring 240 include a circumferentially extending support structure 219. As illustrated in FIG. 2B, the support structure 219 can form an inner circumference (having a diameter 242) of the support ring 240. As shown in FIGS. 2B and 2C, the support ring 240 can have a radial height RH' and a longitudinal width RW'.

In certain variants, the support ring 240 includes one or more flanges 230. As shown, some embodiments of the flange have a generally smooth face along the periphery 236. In some embodiments, the flanges have a plurality of polygonal faces (not pictured), such as the faces 132 discussed above.

The flanges 230 can form a circumferential periphery 236 of the idler wheel 200. As above, the annular radial area between the perimeter line 236 and the inner circumference 242 defines an annular support ring area. In certain embodiments, the sum of the axial aperture areas 215 can be defined as a ratio of the area of the support ring area.

In some embodiments, the support ring 240 includes a plurality of seats 218. The seats 218 can be positioned circumferentially between adjacent struts 210. In certain implementations, the seats 218 include ramps 220, which can have ramp apexes 222 (e.g., a rib or ridge). In some embodiments, the ramps 220 form an angle α' in relation to a line parallel with the longitudinal axis. In certain embodiments, the angle α' may be about: 1°, 3°, 5°, 10°, 15°, 20°, 25°, 30°, 35°, 45°, values between the aforementioned values, and otherwise.

As shown in FIG. 2C, in some embodiments, the idler wheel 200 includes a hub 250 having a hub longitudinal width HW'. In some embodiments, the longitudinal width of the hub HW' is less than the longitudinal width of the support ring RW'. This can allow debris and other contaminants being removed from support ring (e.g., via one or more of the axial and/or radial passages) to be discharged beyond the longitudinal extent of the hub 250. Thus, accumulation of the contaminants on the hub 250 can be avoided or reduced.

In certain embodiments, the struts 210 of the idler wheel 200 can have a lower profile than the teeth 110 of the sprocket 100. Strut/tooth height can be measured from the top of a ramp apex to the top of a strut/tooth. For example, in FIG. 2A, there is zero strut height because the ramp apex 222 is substantially flush with the strut 210. In certain embodiments, strut height can be measured from the strut support structure 219 instead. In some embodiments, a low strut 210 height provides a stronger strut and/or a strut that is less susceptible to wear. In certain variants, the shorter strut provides less material area that could sheer from the wheel when exposed to the movement of the conveyor chain. Further, the low strut 210 profile also limits the amount of space where debris and dirt can accumulate, providing a system that is less likely to wear. In certain embodiments, the idler wheel 200 may lack struts altogether.

Certain embodiments also include a flange support 213. In some embodiments, the flange support 213 elevates the flange away from the idler wheel body 203. In some embodiments, the flange support 213 provides a connection and/or structural support for the flange 230.

In some embodiments, the idler wheel 200 lacks a drive engagement portion. In certain variants, the idler wheel 200 includes an inner seat 201, such as a recess, a surface feature, or an aperture. The inner seat 201 can be configured to engage rotation components (e.g., bearings or bushings) to allow movement of the idler wheel 200 about a round rotational structure (e.g., a pin) and/or as directed by a chain.

Figure 2D:
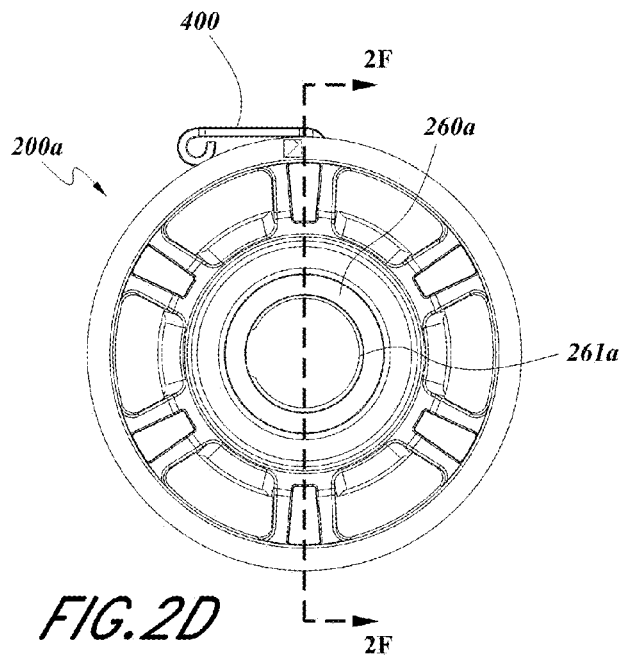
FIGS. 2D-F are views of an idler wheel having a bushing assembly.
Figure 2F:
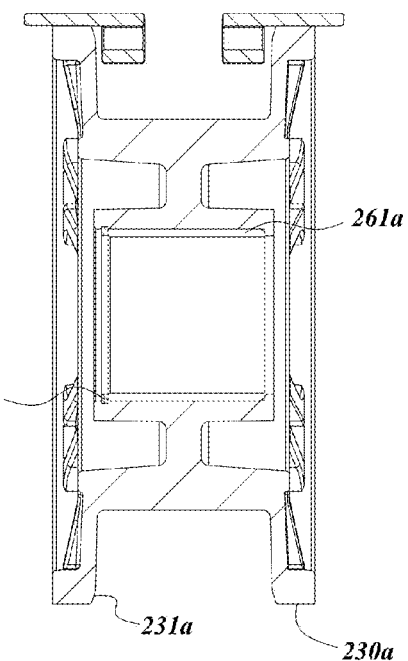
Figure 2E:
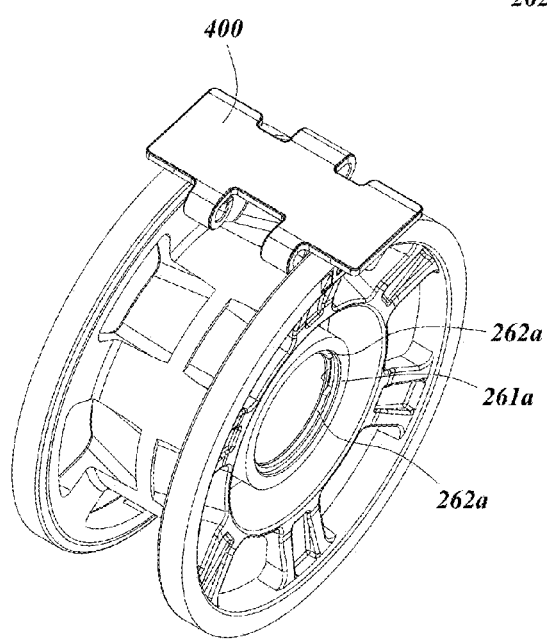

In some embodiments of an idler wheel 200a, a bushing assembly 260a can be included. For example, as shown in FIG. 2D, a bushing assembly 260a can be included in the idler 200a. In certain implementations, the bushing assembly 260a can be removed. In some variants, the bushing assembly 260a is replaceable to allow longer lifetime of the idler wheel 200a. In some embodiments, the bushing assembly 260 comprises an internal bushing 261a as shown in FIGS. 2E and 2F. In certain variants, the internal bushing 261a may be held in place using a locking mechanism 262a (e.g., a clip, retaining ring, or other retaining feature) to secure the internal bushing 261a in the idler wheel 200a. In certain variations, the internal bushing 261a and/or the locking mechanism 262a are absent and a bearing assembly can be locked directly onto the idler wheel 200a. In some embodiments, the bushing or bearing assembly can be used to change the internal diameter of the idler wheel 200 to permit multiple different types of conveyors on which the idler can be used. FIGS. 2D-2F show a portion of a conveyor 400 in contact with the idler wheel 200a.

In certain variants, as shown in FIG. 2F, the flange 230a is substantially perpendicular to the strut surface. In some embodiments, as discussed above, this configuration helps urge contaminants to move out of any axial or radial apertures by the motion of the belt or chain. In certain implementations, also as shown in FIG. 2F, the flange 230a may have a beveled edge 231a which helps guide the belt into idler wheel 200a. In some embodiments, angled configurations (e.g., a beveled edge) may also be advantageous during the fabrication of the idler wheel. For instance, in certain variants, an injection molded idler wheel having angled features is more easily removed from a mold. This eased removal can increase the yield of idler wheels during fabrication.

Figure 2G:
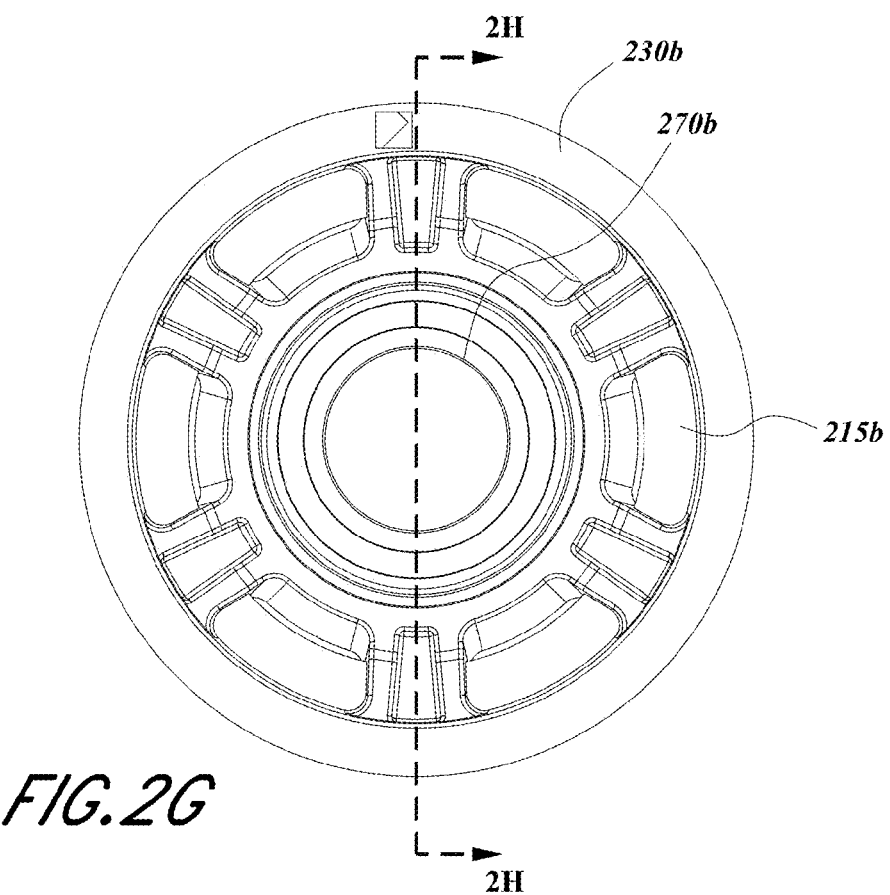
FIG. 2G is a side view of an idler wheel having a bearing assembly.
Figure 2H:
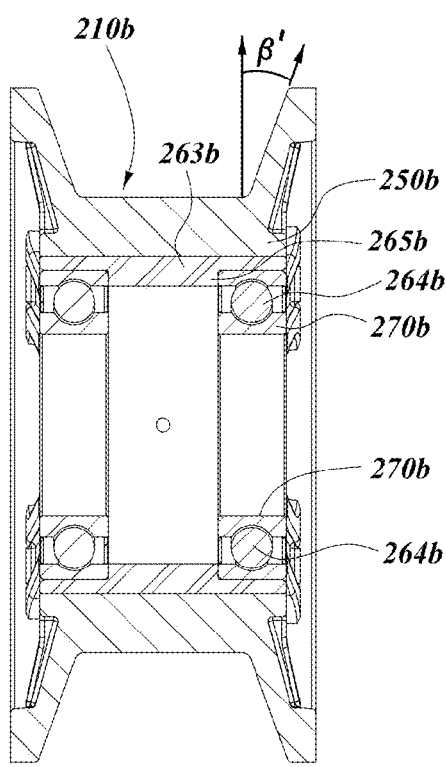
FIG. 2H is a cross-sectional view of the idler wheel of FIG. 2G.
Figure 2J:
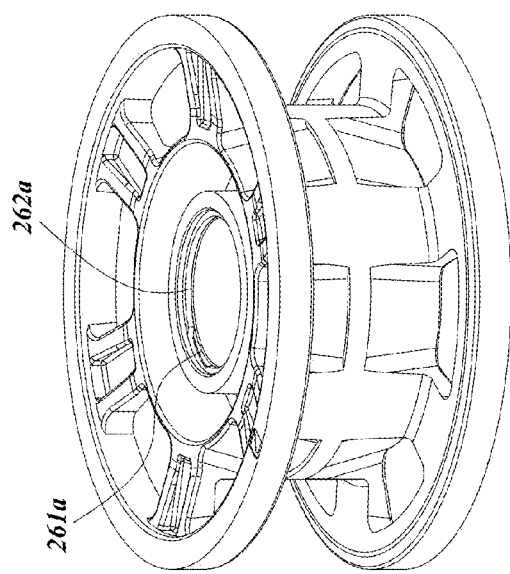
FIGS. 2I-2L are views of the idler wheel of FIG. 2D.
Figure 2I:
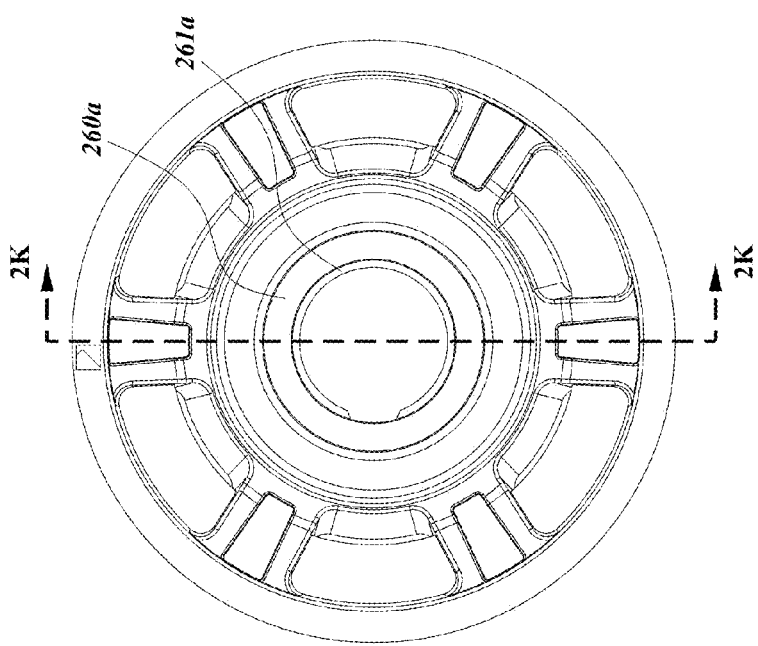
Figure 2L:
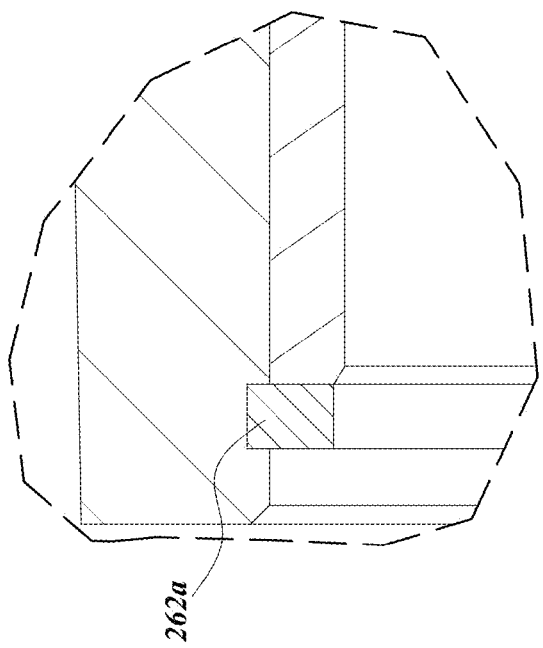
Figure 2K:
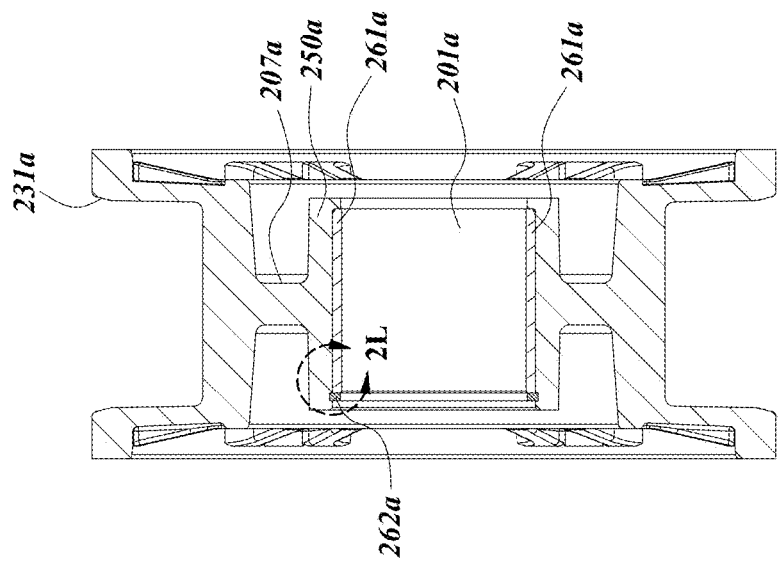

FIGS. 2I-2L are views of the idler wheel of FIG. 2D without the portion of a conveyor 400 in contact with the idler wheel 200a. FIG. 2K (a cross-sectional cut through Plane 2K-2K of FIG. 2I) shows the bushing assembly 261a. FIG. 2L shows an expanded view of a portion of the locking mechanism 262a of the bushing assembly 260a found in FIG. 2K.

FIGS. 2G-2H show another embodiment of an idler wheel 200b. As shown in FIGS. 2G-2H, in some embodiments, the idler wheel 200b hub 250b includes a bearing assembly with one or more bearing rings 270b and one or more bearings 264b. In some embodiments, the bearing assembly includes a housing 263b with a retaining structure, such as a lip 265b. The housing 263b can receive bearing rings 270b on either side of the lip 265b. The bearing rings 270b can be removed and replaced instead of, or in addition to, the rest of the bearing assembly. In some embodiments, the bearing rings 270b can be used to change the internal diameter of the idler wheel 200b to add versatility conveyors on which the idler can be used.

In some embodiments, the idler wheel 200b hub lacks a bearing seat 201b and bearing assembly, and instead has an internal bushing 261b alone. In certain variants, the flange 230b is substantially perpendicular to the radial portion of the strut 210b as shown in FIG. 2F. In some embodiments, this configuration helps to urge contaminants to move out of axial or radial apertures by the motion of the belt.

In certain implementations, as shown in FIG. 2H, the flange forms an angle β' with a line drawn perpendicular from a transversely oriented strut surface. In some variants, the angle β is less than or equal to about: 1°, 5°, 10°, 15°, 20°, 30°, 45°, values between the aforementioned values, or otherwise. In certain embodiments, a beveled edge or an angled flange provide assistance in guiding the conveyor chain or belt as comes into proximity with and contacts the idler wheel. As stated above, in some embodiments, angled configurations may be advantageous during the fabrication of the idler wheel. For instance, in certain variants, an injection molded idler wheel having one or more angled features is more easily removed from a mold. This eased removal can increase the yield of idler wheels during fabrication.

Figure 2N:
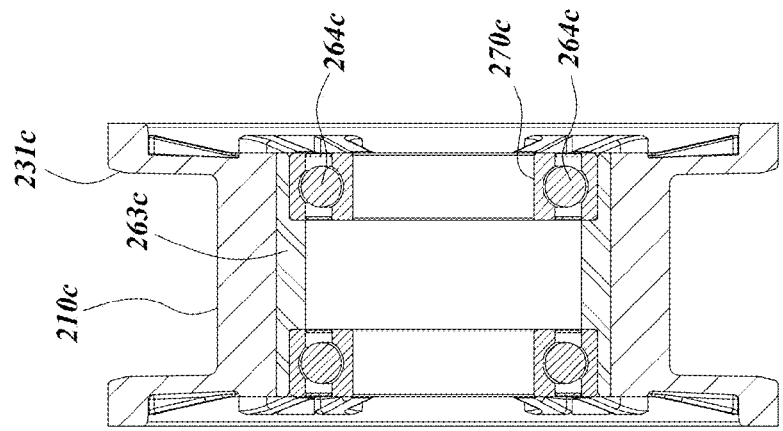
FIGS. 2M-2N are views of another idler wheel having a bearing assembly.
Figure 2M:
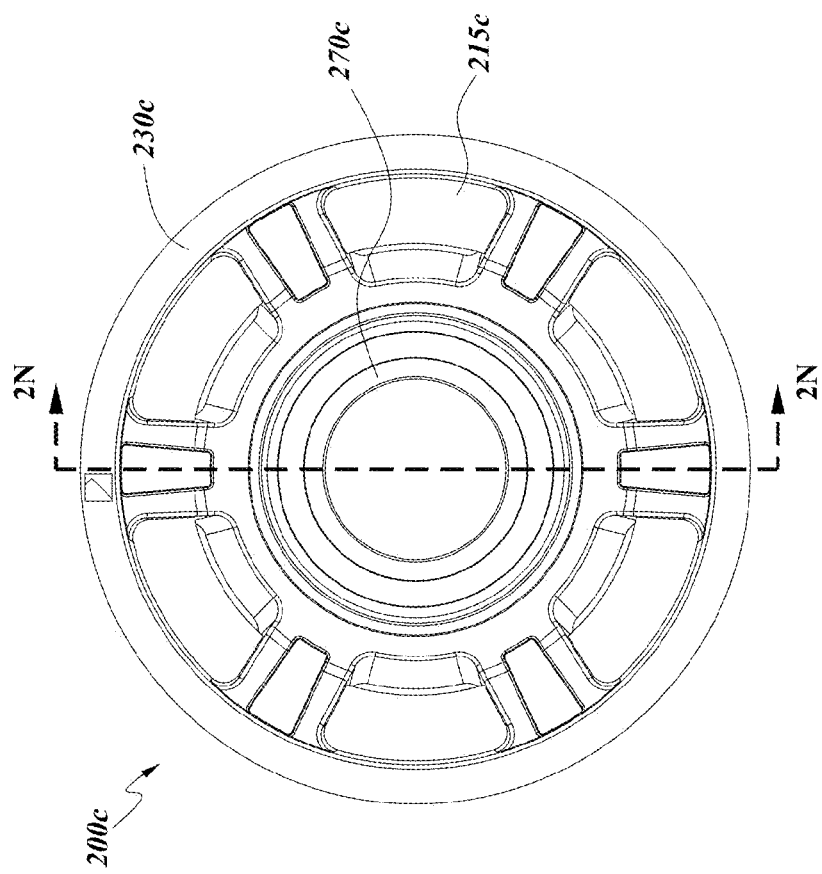

FIGS. 2M and 2N show another embodiment of an idler wheel 200c. In this embodiment, angle β' is substantially 0° and the flange is substantially perpendicular to one or more of the struts 210c. As with all embodiments in this specification, any features, steps, methods, or materials described and/or illustrated in any embodiment in this specification can be used instead of or in addition to any features, steps, methods, or materials described and/or illustrated in this embodiment.

Further Illustrative Sprocket Embodiments

With regards to FIGS. 3A-F, another embodiment of a sprocket is illustrated, this embodiment being a sprocket 300 that is configured to engage with a link of chain 400. The sprocket 300 can be similar, or identical, to the sprocket 100 and/or the idler wheel 200 described above in some ways. As such, the sprocket 300 can include any component, portion, or characteristic (either individually or in combination) of the sprocket 100 and/or the idler wheel 200. Nevertheless, the sprocket 300 can differ from the sprocket 100 and/or the idler wheel 200 in certain respects, some of which are discussed below.

As shown, the sprocket 300 can also include one or more radial passages 316. The radial passages 316 can be located on a tooth ring 340, which can include a plurality of teeth 310 separated by seats 318. In certain embodiments, the radial passages 316 are cut or otherwise formed after the formation of the seats 318. In some implementations, the radial passages 316 are formed with and/or during the forming of the seats 318, such as during a molding operation. In some embodiments, the presence of the radial passages 316 can result in portions of the seats 318 having a reduced longitudinal width.

Figure 3A:
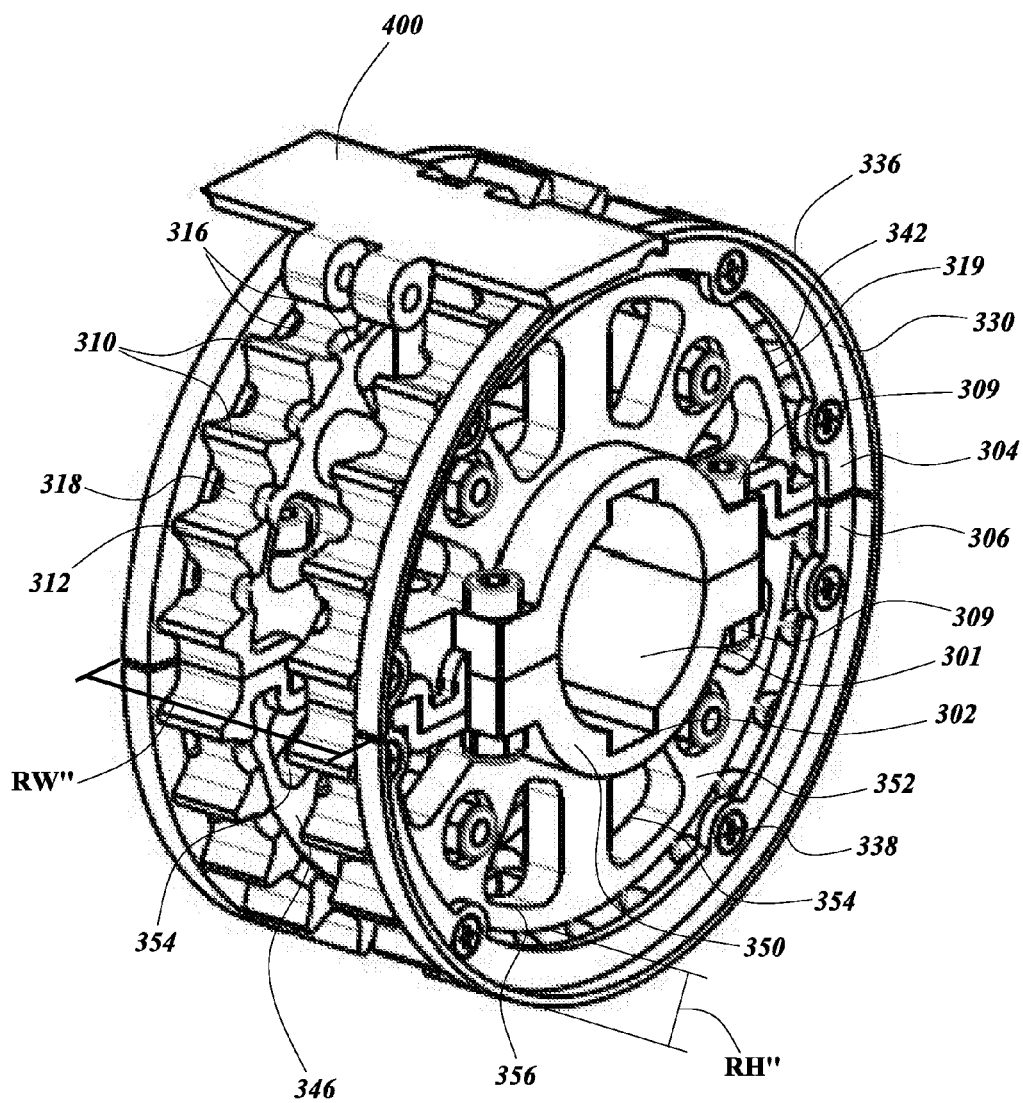
FIG. 3A is a perspective view of another embodiment of a sprocket.

In some embodiments, some or all of the seats 318 include multiple radial passages 316. For example, as shown in FIGS. 3A and 3B, several of the seats 318 include two radial passages 316. This can facilitate rapid evacuation of material from the sprocket 300. For example, the multiple radial passages 316 per seat 318 can increase (e.g., about double) the rate of flow of material through (e.g., radially) the sprocket 300. In certain implementations, each of the radial passages 316 are on the same longitudinal side of the seat 318. In some variants, each of the radial passages 316 are on different longitudinal sides of the seat 318. In the embodiment of FIG. 3B, the two radial passages 316 can be generally curved in opposite longitudinal directions.

As shown in FIG. 3A, the tooth ring 340 can include one or more flanges 330, a tooth support structure 319, a longitudinal width RW", and a radial height RH". Certain embodiments of the flanges 330 are unitarily formed with the tooth support structure 319. In some variants, the flanges 330 are separate components, which can attach to the tooth support structure 319 or otherwise, such as with flange fasteners 338.

In certain variants, the flanges 330 comprise a circumferential periphery 336 and the tooth support 319 defines an inner circumference of the tooth ring 340. As discussed above, the area between the circumferential periphery 336 and the inner circumference 342 defines an annular tooth ring. In some variants, as above, the sum of the axial aperture areas is a ratio of the area of the sum of the annular tooth ring areas.

In some embodiments, the flanges 330 can form a generally smooth radially outward face. Certain implementations have one or more flanges 330 with a plurality of polygonal faces. In some embodiments, the teeth 310 have a tooth face located within a plane tangential to the circumferential axis of the sprocket, which along with the tooth sides, defines a polygonal tooth region 312. Some variants of the sprocket 300 can have an odd or even number of teeth 310.

In some embodiments, the sprocket 300 includes a hub 350, which can have a longitudinal hub width HW". Typically, RW" is greater than HW", which can aid in discharging material from the sprocket 300. In some embodiments, HW" and RW" are related according to the ratios described above. In some variants, the sprocket 300 has a drive engagement portion and drive ridge recess 302.

In some embodiments, the sprocket 300 can be a single piece or can be made up of a first sprocket half 304 and a second sprocket half 306. In some embodiments, the sprocket 300 may comprise more than two pieces divided in planes that include the longitudinal axis. In some embodiments, the sprocket 300 is configured to facilitate retrofitting of conveyor systems. In some embodiments, the first sprocket half 304 and the second sprocket half 306 can be affixed together via fasteners 309 inserted through two or more fastener recesses (not shown).

In certain embodiments, the sprocket 300 has a split design, where an open area (e.g., a void space 346) generally bisects the tooth ring 340 widthwise (e.g., at about the midpoint of the longitudinal width RW") and through a plane running through a radial axis and perpendicular to the longitudinal axis. In some embodiments, the void space 346 has a void width VW. In certain implementations, the void space 346 divides the sprocket 300 into two tooth ring portions 311A, 311B, which can be configured to longitudinally engage.

The tooth ring portions 311A, 311B have tooth portion widths (TW', TW"). Many variations of the ratio between the tooth ring widths TW', TW" and the void width VW are contemplated. For example, the ratio of either of the tooth ring widths TW', TW" to the void width VW can be at least about: 50:1, 40:1, 30:1, 20:1, 10:1, 5:1, 4:1, 3:1, 2:1, 1:1, 1:2, 1:3, 1:4, 1:5, 1:10, 1:20, 1:30, 1:40, 1:50, ratios between the aforementioned ratios, or otherwise. Similarly, many variations of the ratio between the tooth ring widths TW', TW" are contemplated. For example, the ratio of the tooth ring widths TW', TW" can be at least about: 50:1, 40:1, 30:1, 20:1, 10:1, 5:1, 4:1, 3:1, 2:1, 1:1, 1:2, 1:3, 1:4, 1:5, 1:10, 1:20, 1:30, 1:40, 1:50, ratios between the aforementioned ratios, or otherwise.

In certain embodiments, some or all of the teeth 310 in one or both tooth ring portions 311A, 311B can include ramps (not shown). The ramps can include ramp apexes or ridged ramp apexes (not shown). As described above, the ramps can be used to direct debris into the void space 346, the axial passages, and/or the radial passages.

In some embodiments, as shown in FIGS. 3A, 3C, 3D, and 3E, the tooth ring portions 311A, 311B are supported by support members 352. FIG. 3C shows a cross-sectional cut through plane 3C-3C in FIG. 3B, bisecting the sprocket 300 via the void space 346 between the tooth ring portions 311A, 311B. FIG. 3D shows a cross-sectional cut through Plane 3D-3D in FIG. 3C, bisecting the support members 352. In certain embodiments, the support members 352 define several support member openings 354, which can reduce the weight of the sprocket 300 and/or allow dirt and debris collected in the void space 346 to escape the sprocket 300. In certain embodiments, multiple support member openings 354 can be present in either support member 352.

In some embodiments, the inner circumference 342 defines a planar area 345 within the radial plane of the sprocket 300. In certain embodiments, each support member opening 354 defines an aperture area 356 within the planar area 345. In some variants, the sum of each support member opening's 354 aperture area 356 makes up a portion of the total area contained within the inner circumference 342. As illustrated in FIGS. 3C and 3E, the aperture areas 356 can be smaller (e.g., in area) than the inner circumference area 342. For example, the ratio of the area of the aperture area 356 compared to the inner circumference area 342 can be at least about: 1:1.1, 1:1.2, 1:1.3, 1:1.4, 1:1.5, 1:2, 1:3, 1:4, 1:5, 1:10, 1:15, 1:20, 1:25, 1:30, ratios between the aforementioned ratios, or otherwise.

FIG. 3F shows a cross-sectional view of the sprocket 300 cut through Plane 3F-3F in FIG. 3E. In certain embodiments, the support members 352 have support member recesses 362, as shown in FIG. 3F. In some implementations, the support member fasteners 362 can be inserted through the support member recesses 360 to secure the tooth ring portions 311A, 311B together. In certain variants, the tooth ring portions 311A, 311B are separated by a spacing member, such as a hollow cylinder 364. The spacing member 364 can be of varying lengths where longer lengths create a wider void space 346.

Certain Terminology

Several illustrative embodiments of sprockets and idlers have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment, flowchart, or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Terms relating to circular shapes as used herein, such as diameter or radius, should be understood not to require perfect circular structures, but rather should be applied to any suitable structure with a cross-sectional region that can be measured from side-to-side. Terms relating to shapes, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations. Likewise, shapes modified by the word "generally" (e.g., "generally rectangular") can include reasonably close approximations of the stated shape.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language used herein, such as, among others, "can," "could," "might," "may," "e.g.," and the like, unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

SUMMARY

Various embodiments and examples of sprockets and idlers have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

The following is claimed:

1. A self-cleaning sprocket comprising:
 a hub configured to connect with an axle and to rotate about a longitudinal axis;
 a body connected to the hub and extending radially outward from the hub; and
 a tooth ring supported by the body and disposed radially outward of the body, the tooth ring comprising:
  a first longitudinal side and a second longitudinal side;
  a tooth support having a bottom that forms an inner circumference of the tooth ring;
  longitudinally spaced apart first and second flanges extending radially outward of the tooth support, the first flange being located on the first longitudinal side and the second flange being located on the second longitudinal side;
  a plurality of teeth that are circumferentially arranged around the tooth support and that extend between the first and second flanges, the teeth extending from the tooth support to about a radial height of the first and second flanges, the teeth being configured to engage a conveyor belt or chain so as to drive the belt or chain;
  a first plurality of support posts configured to support the first flange and extending radially from the inner circumference of the tooth support to intersect with the first flange, wherein the first plurality of support posts comprises a first support post having a circumferential width;
  a second plurality of support posts configured to support the second flange and extending radially from the inner circumference of the tooth support to intersect with the second flange; and
  a plurality of seats, wherein one of the seats is positioned between each pair of circumferentially adjacent teeth, at least one of the seats comprising:
   a first ramp extending toward the first longitudinal side and being at a first angle with respect to the longitudinal axis;
   a second ramp extending toward the second longitudinal side and being at a second angle with respect to the longitudinal axis;
   a first axial opening intersecting with the first ramp and having circumferential width, wherein the circumferential width of the axial opening is greater than the circumferential width of the first support post; and
  wherein, during engagement of the sprocket with the conveyor belt or chain, contaminants are encouraged down the first ramp and discharged through the first axial opening.

2. The sprocket of claim 1, wherein the seat further comprises a circumferentially extending ridge between the first and second ramp, the ridge configured to engage the belt or chain and at least another one of the seats comprises:
 a circumferentially extending ramp apex, the ramp apex having a radially outermost surface with a radius that is less than a radius of a radially outermost surface of the ridge;
 a third ramp extending from the ramp apex toward the first longitudinal side and being at a third angle with respect to the longitudinal axis; and a fourth ramp extending from the ramp apex toward the second longitudinal side and being at a fourth angle with respect to the longitudinal axis.

3. The sprocket of claim 1, further comprising a radial opening that intersects the first ramp.

4. The sprocket of claim 1, wherein the flanges form an external circumference of the tooth ring forming an outside diameter of the sprocket.

5. The sprocket of claim 4, wherein at least one tooth extends radially outward and terminates as a crest face that intersects the flanges at the outside diameter of the sprocket.

6. The sprocket of claim 1, wherein the first angle is between about 1° and about 30° with respect to the longitudinal axis.

7. The sprocket of claim 6, wherein the second angle is between about 1° and about 30° with respect to the longitudinal axis.

8. The sprocket of claim 1, wherein the first axial opening is longitudinally offset from a longitudinal end of the hub, such that contaminants discharged through the first axial opening are discharged beyond the longitudinal end of the hub.

9. A self-cleaning idler wheel comprising:
a hub configured to connect with an axle and to rotate about a longitudinal axis;
a body connected with the hub and extending radially outward from the hub; and
a strut ring supported by the body and disposed radially outward of the body, the strut ring comprising:
a first longitudinal side and a second longitudinal side;
a strut support having a bottom that forms an inner circumference of the strut ring;
longitudinally spaced apart first and second flanges extending radially outward of the strut support, the first flange being located on the first longitudinal side and the second flange being located on the second longitudinal side;
a plurality of struts that are circumferentially arranged around the strut support and that extend between the first and second flanges, the struts being configured to engage a conveyor belt or chain so as to support the belt or chain; and
a plurality of seats, wherein one of the seats is positioned between each pair of circumferentially adjacent struts, at least one of the seats comprising:
a circumferentially extending ridge that extends radially outwardly from the strut support and that is recessed radially inwardly from an external circumference of the first flange or the second flange, the ridge configured to engage the belt or chain;
a first ramp extending from the ridge toward the first longitudinal side and being at a first angle with respect to the longitudinal axis;
a second ramp extending from the ridge toward the second longitudinal side and being at a second angle with respect to the longitudinal axis; and
a first radial opening intersecting with the first ramp;
wherein, during engagement of the idler wheel with the conveyor belt or chain, contaminants are encouraged down the first ramp and discharged through the first radial opening.

10. The idler wheel of claim 9, wherein at least another one of the seats comprises:
a circumferentially extending ramp apex, the ramp apex having a radially outermost surface with a radius that is less than a radius of a radially outermost surface of the ridge;
a third ramp extending from the ramp apex toward the first longitudinal side and being at a third angle with respect to the longitudinal axis; and
a fourth ramp extending from the ramp apex toward the second longitudinal side and being at a fourth angle with respect to the longitudinal axis.

11. The idler wheel of claim 9, further comprising an axial opening that intersects the first ramp.

12. The idler wheel of claim 9, wherein the first angle is between about 1° and about 30° with respect to the longitudinal axis.

13. The idler wheel of claim 9, wherein the second angle is between about 3° and about 15° with respect to the longitudinal axis.

14. The idler wheel of claim 9, wherein each seat comprises an axial opening.

15. A sprocket comprising:
a hub configured to connect with an axle and to rotate about a longitudinal axis;
a body connected with the hub and extending radially outward from the hub; and
a tooth ring supported by the body and disposed radially outward of the body, the tooth ring comprising:
a first longitudinal side and a second longitudinal side;
a tooth support having a bottom that forms an inner circumference of the tooth ring;
longitudinally spaced apart first and second flanges extending radially outward of the tooth support, the first flange being located on the first longitudinal side and the second flange being located on the second longitudinal side;
a plurality of teeth that are circumferentially arranged around the tooth support and that extend between the first and second flanges, the teeth being configured to engage a conveyor belt or chain so as to drive the belt or chain; and
a plurality of seats, one of the seats being positioned between each pair of circumferentially adjacent teeth;
wherein at least one of the seats comprises:
a circumferentially extending ridge that extends radially outwardly from the tooth support and that is recessed radially inwardly from an external circumference of the first flange or the second flange, the ridge configured to engage the belt or chain;
a first ramp extending from the ridge toward the first longitudinal side and being at a first angle with respect to the longitudinal axis;
a second ramp extending from the ridge toward the second longitudinal side and being at a second angle with respect to the longitudinal axis; and
wherein the ridge projects outwardly radially from an end of the first and second ramp;
wherein at least another one of the seats comprises:
a circumferentially extending ramp apex, the ramp apex having a radially outermost surface with a radius that is less than a radius of a radially outermost surface of the ridge;
a third ramp extending from the ramp apex toward the first longitudinal side and being at a third angle with respect to the longitudinal axis;
a fourth ramp extending from the ramp apex toward the second longitudinal side and being at a fourth angle with respect to the longitudinal axis; and
wherein apex is substantially flush with an end of the third and fourth ramp.

16. The sprocket of claim 15, wherein the first ramp intersects with an axial opening.

17. The sprocket of claim 15, wherein the first ramp intersects with a radial opening.

18. The sprocket of claim 15, wherein each seat comprises an axial opening.

19. The sprocket of claim 15, wherein each seat comprises a radial opening.

20. The sprocket of claim 15, wherein the ridge is located at a longitudinal center point of the sprocket between the first and second ramp.

21. The sprocket of claim 15, wherein the apex is located at a longitudinal center point of the sprocket between the third and fourth ramp.

22. The sprocket of claim 15, wherein the first flange and the second flange are polygonal.

23. The sprocket of claim 15, wherein the first and second flanges have substantially smooth faces.

24. The sprocket of claim 15, wherein the first flange has a substantially smooth face and the second flange is polygonal.

25. The sprocket of claim 15, wherein the sprocket comprises two portions, wherein the two portions connect along a diameter of the sprocket to form the sprocket.

\* \* \* \* \*